Sept. 1, 1936. J. V. CAPUTO 2,052,965
CONTROL SYSTEM FOR ELECTRIC WELDERS
Filed June 30, 1933 11 Sheets-Sheet 5

INVENTOR
James V. Caputo
by his attorneys
Byrnes, Stebbins, Parmelee & Blenko

Sept. 1, 1936.  J. V. CAPUTO  2,052,965
CONTROL SYSTEM FOR ELECTRIC WELDERS
Filed June 30, 1933  11 Sheets-Sheet 6

INVENTOR
James V. Caputo
by his attorneys
Byrnes, Stebbins, Parmelee & Banks

Sept. 1, 1936.    J. V. CAPUTO    2,052,965
CONTROL SYSTEM FOR ELECTRIC WELDERS
Filed June 30, 1933    11 Sheets-Sheet 11
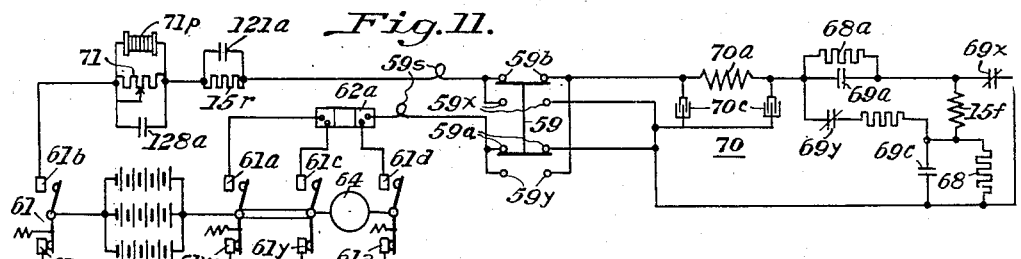
Fig. 11.
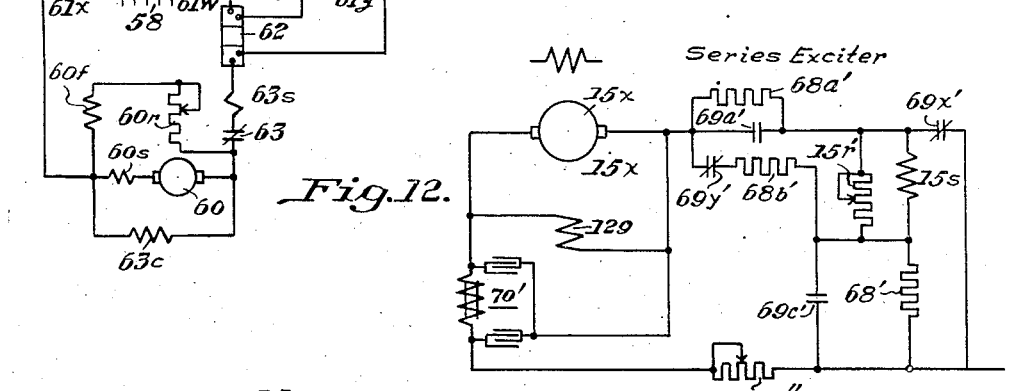
Fig. 12.
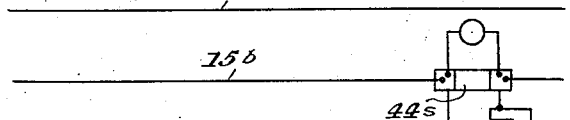
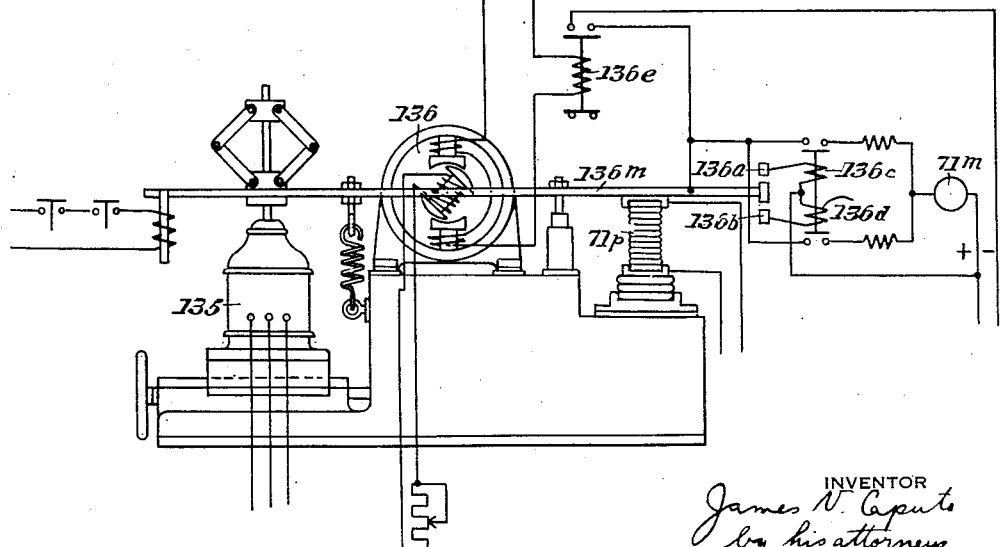
Fig. 13.
INVENTOR
James V. Caputo
by his attorneys
Byrnes, Stebbins, Parmelee & Blenko Patented Sept. 1, 1936

2,052,965

UNITED STATES PATENT OFFICE 2,052,965

CONTROL SYSTEM FOR ELECTRIC WELDERS

James V. Caputo, Girard, Ohio

Application June 30, 1933, Serial No. 678,425

26 Claims. (Cl. 219—4)

My invention relates to electric welding and, in particular, to a system for automatically controlling the operation of an electric welding apparatus and associated mechanism.

Electric welding devices have heretofore been operated almost entirely under manual control. These devices are of large size, especially when designed to weld large articles such as pipe having a diameter of 24 inches and a length of 30 to 50 feet. It will be obvious that a large force of operators is necessary to control apparatus of this size properly and that it is difficult for an operator at one portion of the machine to know what conditions are in other portions thereof.

My invention provides automatic means for controlling the operation of a welding machine of even the largest size and makes it possible for a single operator to have all parts of the machine under his individual control at all times, as well as providing definite information as to the conditions in all parts thereof.

Continuous resistance welding as practiced heretofore has been effected almost universally by the aid of alternating current. Because of the continuously varying character of alternating current, a weld produced thereby usually lacks perfect continuity. For this reason, I prefer to employ direct current so as to obtain a weld which is entirely continuous and perfectly uniform. As a source of current, I employ a homopolar generator. I control the voltage of the generator both by varying its excitation and by changing the speed at which it is driven. For the purpose of providing a wide variety in generator speed, I drive the generator by a variable speed motor and supply the motor with current from a variable voltage generator.

The current is conducted to the work by means of an electrode comprising two insulated disc-like conducting members having suitable connections to the generator. In order to equalize the wear on the disc-like electrode members, I provide means actuated by the work for reversing the polarity of the generator at intervals between the passage of successive pieces of work through the welder.

I also employ means actuated by the work for controlling the excitation of the generator to insure that the welding voltage will be at the proper value when the work engages the electrode. Similar means effects a discontinuance of the welding current as the work is about to leave the electrode. I further employ means actuated by the work for controlling the speed of the welding generator to insure that the welding voltage will be maintained at the proper value at all times, when the work engages the electrode and while welding; and further, similar means effects the discontinuance of the welding current as the work is about to leave the electrode. Either the speed of the generator or its excitation, or both, can be varied for this purpose. In order to establish the generator voltage in a minimum time, I temporarily over-excite the generator during the initial building up of the voltage. In order to terminate the welding current promptly, I apply a small reverse excitation to the generator so that its voltage rapidly decreases to zero at the proper time.

Numerous auxiliary devices, such as forming rolls, feed rolls, planishing rolls and sizing rolls, are usually incorporated in a pipe welding device. I provide a generator for supplying current to the motors driving such auxiliaries. I control the speed of the auxiliaries first by varying the voltage of the generator and then by individual control of each motor. The operation of the auxiliaries is governed by a single manual controller within reach of the operator of the apparatus. Since it is sometimes necessary to reverse the forming rolls, feed rolls, etc., I provide means for reversing the polarity of the generator supplying current to the auxiliary motors. It is not desirable to reverse the electrode motor with the other auxiliaries while a blank is traversing the welder, because of the possibility of injury to the electrode resulting from engaging the extruded burr on the welded seam. I therefore provide means to lift the electrode out of contact with the work upon reversal of the auxiliaries or in any other emergencies, such as failure of power when a blank is in the welder.

I also provide means for automatically controlling the voltage of the welding generator during a welding operation and for automatically controlling the speed of the auxiliaries. This means comprises a master frequency generator and means for comparing the frequency generated thereby with frequencies characteristic of the operation of the other elements of the apparatus. I also provide means for safeguarding the apparatus against abnormal conditions of various kinds. The operation of the various elements, furthermore, is suitably interlocked so that it is impossible to effect an improper sequence of operations.

For a more complete understanding of the invention, reference is made to the accompanying drawings illustrating a present preferred embodiment. It will be understood, however, that numerous changes in the described embodiment may be made within the scope of my broader claims. In the drawings:—

Figures 1 through 5, when positioned relative to each other, as will be described later, constitute a circuit diagram partly in the complete form and partly schematic, of the system of my invention, illustrating the various elements thereof in somewhat the general relative position they will occupy in an actual installation;

Figures 6 through 10, when placed together relative one to another in a manner to be described, constitute a diagram, almost entirely schematic, in which the circuits to the various elements shown in Figures 1 through 5 are illustrated in simplified form;

Figure 11 is a partial schematic view illustrating certain of the subject matter of the preceding figures to an enlarged scale in simplified form;

Figure 12 is a similar view of another portion of the system;

Figure 13 is a diagrammatic view illustrating a modified form of apparatus for controlling the welding current;

Figure 14 is a side elevation of one of the control devices employed in the system;

Figure 15 is a sectional view along the line XV—XV of Figure 14;

Figure 16 is a schematic showing of the proper location of Figures 1 through 5 to constitute a complete diagram;

Figure 17 is a diagrammatic view illustrating the proper placing of Figures 6 through 10 to constitute the schematic diagram; and Figure 18 is a partial modification shown diagrammatically.

Figure 1:
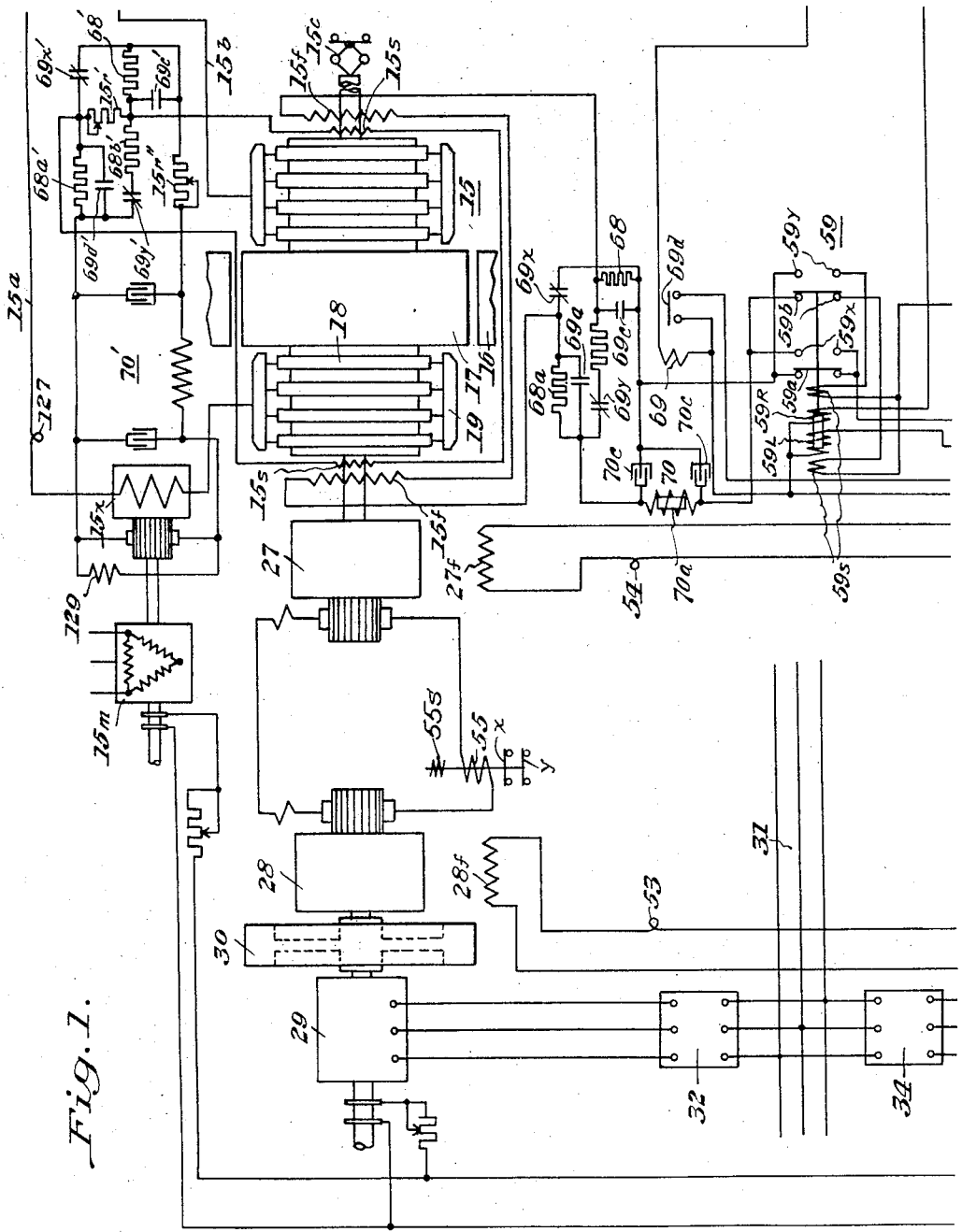

It will be understood that the several elements of a single control device, a relay, for example, will be shown in different parts of the schematic circuit in order to simplify the connections. The actual moving parts of the control devices may thus sometimes be duplicated, being shown both in the circuits which they control and in operative relation to the devices by which they are actuated.

*General arrangement of the power apparatus and auxiliaries*

The general arrangement of the power apparatus for generating, controlling and distributing the welding current may best be observed in Figures 1 through 5, when positioned relative to one another as indicated in Figure 16.

The welder proper is shown at 10 and comprises a shaft-mounted electrode 11 supported in bearings 12 suspended from a frame 13. The adjustment of the bearings 12 is controlled by suitable screws driven by a motor 14. Current is supplied to the electrode 11 from a generator 15. The generator is preferably of the homopolar type having a field structure partially indicated at 16, an armature 17 composed of a plurality of inductors, slip rings 18, and brush rigging 19. Opposite terminals of the generator 15 are connected to an electromechanical coupling 20 comprising a shaft 21 which is coupled through universal joints to the shaft on which the electrode 11 is mounted, and electrical connections including slip rings 22, brush assemblies 23, bearings 24, and spaced, flexible, connecting cables 25. The bearings 24 are similar to the bearing 12 and each comprises a disc mounted in antifriction bearings having conducting members extending axially therethrough but insulated therefrom. A motor 26 drives the shaft 21.

The generator 15 is driven by a motor 27 which is preferably a shunt-wound, direct-current motor. The motor 27 derives energy from a generator 28 connected thereto. A motor 29, preferably of the synchronous, alternating-current type, is directly coupled to the generator 28 to drive the latter and a flywheel 30 is preferably mounted on the shaft for a purpose which will appear later. Electrical energy is supplied to the motor 29 from a supply circuit 31 through a circuit breaker 32.

In addition to the main power generator and transmitting units above mentioned, I provide other apparatus for controlling the speed of the motor 26 driving the welder electrode, and all other motors driving auxiliary devices, such as forming rolls, sizing rolls, feed rolls and finishing rolls. This equipment includes a motor 33 preferably similar to the motor 29. The motor 33 is connected to the supply circuit 31 through a circuit breaker 34 and is mechanically coupled to a generator 35 which is preferably a direct-current generator capable of the necessary adjustment for generating a variable voltage. A flywheel 36 is mounted on the shaft of the motor 33. The motor 33 also drives a generator 37 for supplying energy to a control bus having conductors 38 and 38'. Exciter generators 39 and 40 are also driven by the motor 33 and supply excitation for the field windings of the generator 28 and the motor 27.

For satisfactory welding, it is necessary to vary the magnitude of the welding current in accordance with the speed of travel of the pipe blanks past the electrode. I effect the desired control of the welding current by comparing the frequency of the output of an alternating-current generator driven at a speed proportional to that of the movement of the blanks through the welder, with the frequency of the output of a generator driven at a speed proportional to the magnitude of the welding current. The master-frequency generator is illustrated at 41 and is driven by a motor 42 connected directly across the terminals of the generator 35 by conductors 42m and 42g. An alternating-current generator 43 is coupled to a motor 44 which is preferably of the direct-current type, differential-compound wound. A synchronous motor 45 is also coupled to the motor 44 to drive the generator 43 in the intervals between successive passages of pipe blanks through the welder, at which times the motor 44 is not energized.

For cooperating in the speed control of the motors of the various auxiliaries, of which it will be understood there are a plurality similar to the motor 26, I utilize for each auxiliary motor, such as 26, a generator 46 driven thereby through a variable speed drive 47. The manner in which the generator 46 cooperates with the master frequency generator 41 in controlling the speed of the motor 26 will become apparent as the description proceeds.

*Starting operation of the system*

The first step in commencing the operation of the system is the starting of the motors 29 and 33. While I have illustrated no specific starting equipment for these motors, any known type of equipment may be employed. When the motors are brought to synchronous speed, the circuit breakers 32 and 34 are closed to insure continuous operation of the motors at rated speed. A circuit breaker 37a is closed by the energization of its closing coil 37q, controlled by push buttons 37t and 37v, relay 37w and an interlock 48a on a relay 48 in the generator field circuit. As the motor 33 accelerates, the voltage of the control generator 37 builds up across the buses 38, 38'. The generator 37 has a shunt field 37f and a series field 37s, as well as a shunt field rheostat 37r. The operating winding of a relay 48 is connected in series with the shunt field 37f and the rheostat 37r across the terminals of the generator 37. The excitation for the motor 33 is obtained from the buses 38, 38' which are shown connected to the slip rings of the motor through a suitable rheostat.

Accelerating the motor 33 to normal operating speed also causes the exciter generators 39 and 40 to supply limited current to the shunt field windings 28f and 27f of the generator and motor 28 and 27, when suitable excitation is provided for the generator field windings 39f and 40f. The excitation of the field windings of the generators 39 and 40 is controlled by the adjustment of a dual rheostat 49 which is normally in such position as to cause the generator 28 to drive the motor 27 at the normal speed of the generator 15. The rheostat has two resistance elements 49a and 49b and two wipers 49c and 49d. The rheostat is actuated by a motor 49m having forward and reverse field windings 49f and 49r connected in series with limit switches 49L adapted to be actuated by the wipers in their extreme positions. The exciter generator 39 has a field winding 39f which is connected in series with a protective resistor 39r and the resistance element 49a of the rheostat 49, across the buses 38, 38'. The field winding 40f of the exciter generator 40 is similarly connected across the buses 38, 38' in series with a resistor 40r and the resistance element 49b of the rheostat 49. The field windings 39f and 40f are normally short-circuited by back contacts 50x and 50y of a relay 50 (see Figure 6). The relay 50 also has front contacts 50a and 50b effective when the relay winding is energized to shunt resistors 39r and 40r. After the motor 33 has been started and until the winding of the relay 50 has been energized, therefore, current flows from the bus 38, through parallel circuits, one including the wiper 49c, the back contact 50x and the resistance 39r, the other including wiper 49d, back contact 50y and resistance 40r. The rheostat 49 is shown in normal position, and full excitation will be supplied to the generator 28 and the motor 27 when the relay 50 operates, and the generator 15 will, thereupon, be started and driven at full speed.

Relays 51 and 52 have their windings connected in series with the circuits just described but are not operatively energized until the relay 50 is operated to shunt resistors 39r and 40r. Similar relays 53 and 54 have their windings connected in series with the shunt fields 28f and 27f. A relay 55 has its operating winding connected in series with the armatures of the generator 28 and motor 27. The relay 55, in common with most of the other relays to be described, has a shunt holding coil 55s which is energized by the operation of the relay and, while not strong enough to operate the relay, is strong enough to hold it in operated position once it has been actuated by its main winding 55.

When it is desired to supply normal excitation to the generator 28 and motor 27 preparatory to starting the latter, the relay 50 must be energized by pressing a push button 56 (see Figure 6). Operation of the push button 56 completes a circuit from the conductor 38 of the control bus through a back contact 55x of the relay 55, the contact 56b of the push button, the winding of the relay 50, the contact 56a of the push button 56, to the conductor 38'. The operation of the push button 56 also completes a circuit through back contact 55x and contact 56b through the winding of a relay 57 and a centrifugal switch 15c driven in accordance with the speed of the generator 15. The relay 57 is thereby operated.

The energization of the winding of the relay 50 causes contacts 50x and 50y to open, and contacts 50a and 50b to close. The field windings 39f and 40f are now energized to a degree dependent upon the adjustment of the rheostat 49 and relays 51 and 52 are operated. The excitation of the field windings causes the generators 39 and 40 to supply exciting current to the shunt field windings 28f and 27f of the generator 28 and the motor 27. The generator 28 builds up its voltage and starts the motor 27. This current also traverses the windings of the relays 53 and 54 to energize the latter. The operation of the relays 51, 52, 53, 54 and 57 completes a locking circuit for the relay 50. This circuit extends from the conductor 38 through back contact 55x, contact 57a, the winding of the relay 50, contacts 51a and 52a, contacts 53a and 54a, to the conductor 38'. This circuit remains closed as long as the relay 55 is not energized sufficiently to open its contact 55 nor the relays 51 through 54 deenergized. The relay 55 is set to operate only upon the flow of a predetermined, excessive current from the generator to the motor as in case of an overload.

Excitation has now been supplied for the generator 28 and the motor 27 and the former has been started and supplies driving current to the latter. Thus the motor 27 driving the generator 15 is accelerated to bring the generator 15 up to speed.

*Welding generator excitation*

When the welding generator 15 has been brought up to speed, the generation of welding voltage at the electrode 11 may be effected by supplying suitable excitation for the generator. The generator 15 has field windings 15f connected in series and compound windings 15s also connected in series. The former are energized from a constant voltage source, such as a storage battery 58, through a reversing switch 59.

In order to maintain the battery 58 in a properly charged state, I employ a battery-charging generator 60 which is directly coupled to the driving motor 33. A switch operated by an electromagnet 61 controls the connection of the battery 58 alternately to the field windings 15f and the charging generator. The battery is connected to the generator field during the interval when a pipe blank is passing through the welder, to supply to the welding generator 15 the excitation needed to insure that sufficient welding current is delivered. In the intervals between successive passages of pipe lengths through the welder, the battery is connected to the charging generator. Automatic means are provided for cutting off the battery from the generator when it is sufficiently charged.

Figure 2:
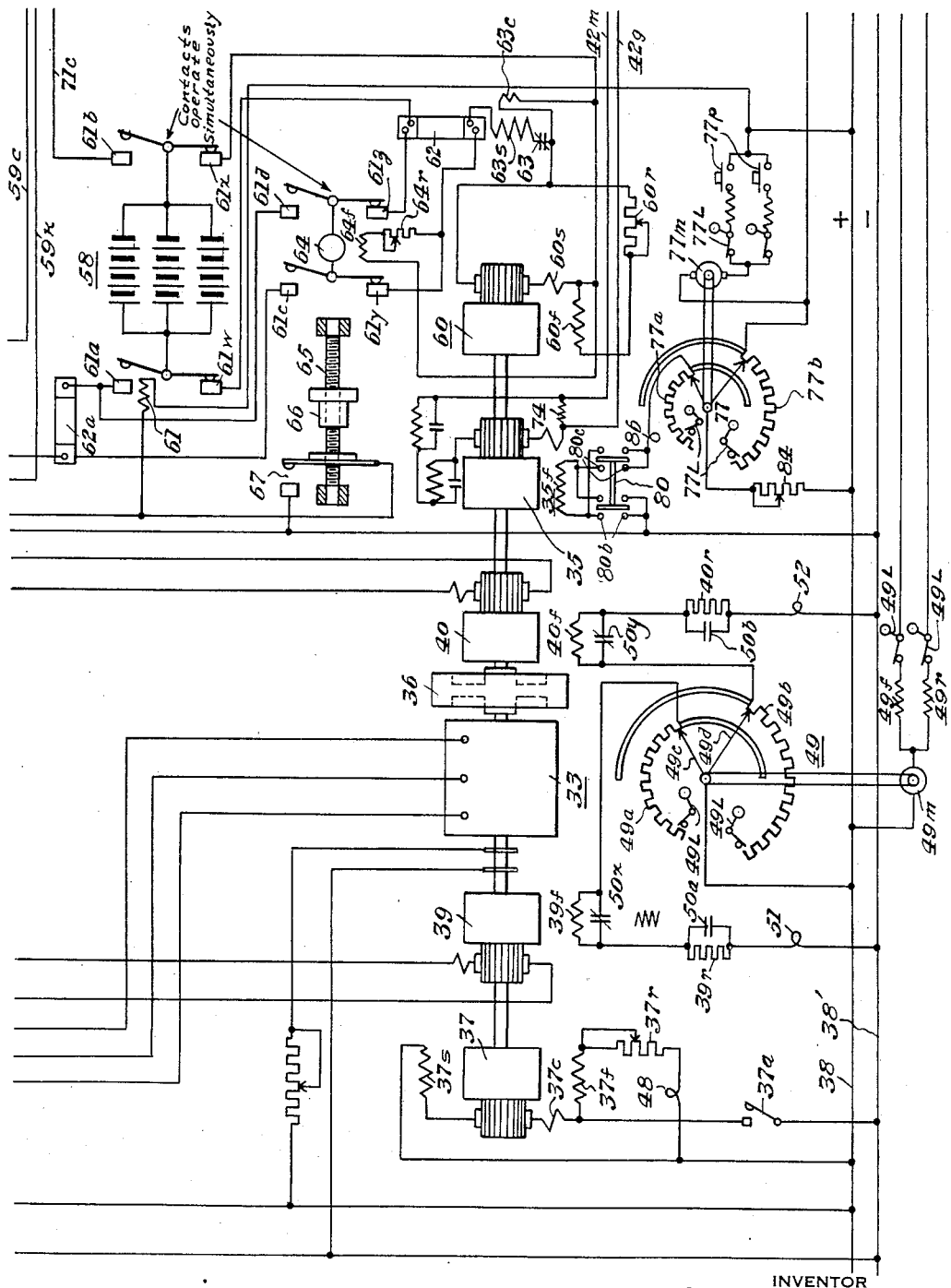

The switch 61 has four front contacts 61a, 61b, 61c and 61d, and four back contacts 61w, 61x, 61y and 61z. These latter contacts are normally engaged as illustrated in Figure 2. In this position, one terminal of the battery 58 is connected through the contact 61x to the lower brush of the generator 60. The other terminal of the battery is connected through the contact 61w, a shunt 62, a series coil 63s and the back contact of a reverse current cutout 63 to the upper brush of the generator 60. The cutout 63 has a shunt coil 63c connected across the generator 60 and the purpose of the cutout is to protect the battery against any possible reversal of the polarity of the generator 60. The shunt field winding of the latter is shown at 60f, the field rheostat at 60r and the series winding at 60s.

I provide what is, in effect, an ampere hour meter for measuring the time the battery 58 is on charge, as well as the time it is on discharge. This device comprises a motor 64 having its armature connected through the back contacts 61y and 61z of the switch 61 across the shunt 62. The voltage across the armature 64, therefore, is proportional to the current flowing through the shunt. The field 64f of the motor is connected across the armature of the generator 60 in series with a rheostat 64r and the series coil 63s and contact 63 of the reverse current cutout. The motor 64 drives a screw shaft 65 on which a traveling nut 66 is threaded. While the battery is being charged, the motor 64 drives the shaft 65 in a direction such as to move the nut 66 toward the left, and vice versa. When the battery has been fully charged, the traveling nut 66 actuates a contact 67 to complete a circuit from the bus 38' through said contact and the operating coil of the switch 61 to the bus 38. The switch 61 then operates to close the contacts 61a, 61b, 61c and 61d and open contacts 61w, 61x, 61y and 61z. The opening of the contacts 61w and 61x breaks the charging circuit and the opening of the contacts 61y and 61z disconnects the motor 64.

The energization of the operating coil of the switch 61 prepares a circuit between the storage battery 58 and the shunt fields 15f of the generator 15. The polarity of the exciting current, however, is controlled by the switch 59. This circuit extends from one terminal of the battery 58 through contact 61a, a shunt 62a, a front contact 59a of the switch 59 to (but not through) a resistor 68, through a back contact 69x in parallel with the field windings 15f in series, through a resistor 68a, a filter 70 including condensers 70c and an inductance 70a, front contacts 59b of the switch 59, a series holding coil 59s and thence by a conductor 59c to rheostat 15r, and through a motor operated rheostat 71, from which the circuit extends by conductor 71c to contact 61b of the switch 61 and thence to the other terminal of the battery 58. This circuit may be more easily observed in Figure 11. It will be apparent from the foregoing description that the field windings 15f are connected across the resistor 68 by the contact 69x of the contactor 69 and that the battery is connected to the field windings to supply a limited excitation of the predetermined polarity. The motor 64 is thereby operated at creeping speed in the discharge direction. This polarity is opposite that of the excitation supplied during a welding operation on the energization of the contactor 69, and is effective to reduce the welding voltage promptly to zero.

The welding generator has now been started and supplied with a limited excitation insufficient to generate the normal welding voltage, and until a pipe blank is fed past the electrode 11, furthermore, no current will flow from the generator 15.

When current actually begins to flow from the generator 15, an exciter generator 15x having its field winding in series with the generator 15, will be excited to produce a compound excitation. The generator 15x is driven at a constant speed by a motor 15m and is connected to the series field windings 15s of the generator 15 by a circuit similar to that through which the field windings 15f are connected to the reversing switch 59. The circuit can be observed more clearly in Figure 12. The circuit for the series field windings 15s extends from the armature of the generator 15x through a filter circuit 70' similar to that shown at 70, through a rheostat 15r", a back contact 69x', which is closed when the coil 69 is deenergized, through the field windings 15s in parallel with a rheostat 15r' and thence to the other side of the generator armature through a resistor 68b' and a back contact 69y' of the contactor 69. A resistor 68a' parallels the circuit winding 15s and the portion of the circuit therefor last described.

When the contactor 69 is actuated, the circuit for the windings 15s extends through the rheostat 15r", a front contact 69c', the windings 15s in parallel with which is connected the adjusting rheostat 15r', and a contact 69a' to the other terminal of the armature. It will be apparent that the direction of current through the windings 15s is reversed upon operation of the contactor 69. The field winding is normally connected across a resistor 68', and the resistors 68a' and 68b' are of such value that a predetermined reverse current will flow through the series field upon deenergization of the contactor 69, to assist in reducing the welding generator voltage to zero.

*The starting of the auxiliary motors—preliminary operations*

When the welding generator has been started, the next step in the operation of the system is to advance a pipe blank to the welder. This requires that the motors driving the forming rolls, feed rolls, pressure rolls (if driven), planishing rolls and sizing rolls, and the electrode motor, be started to forward the blank to and through the welder. As already stated, these motors are all driven by current supplied from the generator 35. Since the motor and its control apparatus is duplicated for each auxiliary device, I have shown the complete circuit for only one motor. It will be understood, of course, that similar equipment will be provided for all other motors. The motor having its circuit illustrated in complete detail is the motor 26 driving the electrode.

All the auxiliary motors are started simultaneously by controlling the excitation of the generator 35. As a preliminary step, however, it is necessary to close a push button switch for each motor to be started. Examples of these push buttons are shown at 72 and 73 in Figure 10, these being the push buttons for controlling the motors 26 and 42. These push buttons are provided with a mechanical hold-down mechanism which keeps the contacts closed until manually released. Instead of push buttons, of course, any other type of manual switch may be employed.

Operation of the push button 72 completes the circuit from the bus 38 through contact 72a of the push button, a back contact 74x of a relay 74, a limit switch 75, contact 72b of the push button, the operating coil of the relay 76, to the bus 38'. The relay 76 closes its front contact 76a. The closing of this contact establishes a holding circuit including a contact 72c of push button 72, for the coil of relay 76. The circuit extends from the bus 38 through contact 72c, contact 76a, and the coil of relay 76. The winding of the relay 74 is connected directly across the armature of the generator 35 but since the field of the latter has not yet been excited, there is no voltage to operate the relay and the contact 74x remains closed. The limit switch 75 is closed by the operation of a rheostat 77 similar to the rheostat 49, for controlling the excitation of the generator 35. The limit switch 75 may be similar to the switches 77L controlling the circuit of the motor 77m which operates the rheostat 77, except that the limit switch 75 is closed only when the rheostat is in such position as to insert the full resistance thereof in series with the shunt field of the generator 35 shown at 35f.

Operation of the push button 73 is effective to energize a relay 78 and complete a holding circuit therefor at its front contact 78a in the same manner as already described for the relay 76. Additional push buttons and relays are provided, of course, for each of the auxiliary motors incorporated in a complete operative welder.

The connection of the various motors to the generator 35 is controlled by the push buttons, such as 72 and 73. The electrode motor 26, for example, is adapted to be connected to the terminals of the generator 35 by buses 35a and 35b through a contactor 79a, the operating coil 79 of which is controlled by the relay 76. The circuit of the coil 79 also includes an interlock 80a which is closed by a reversing switch 80 only when the latter is operated so as to cause the generator 35 to generate voltage of a polarity such as to cause rotation of the auxiliary motors to move a pipe length forward through the welder. When the reversing switch 80 is in the other position for effecting reverse movement of a blank for any reason, the interlock 80a is opened. Only the electrode motor 26, of all the auxiliaries, is controlled by the interlock 80a.

The circuit of the contactor coil 79 is also controlled by a relay 81 in series with the shunt field winding of the motor 26. This winding is normally energized as soon as the generator 37 is connected to the buses 38, 38', and the relay 81, therefore, immediately closes its contact 81a. A centrifugal switch 26a responsive to the speed of the electrode motor 26 is also in the circuit of the coil 79.

Since the reversing switch 80 is normally in neutral or central position, the interlock 80a is open and the circuit of the coil 79 of the contactor 79a is not completed until the reversing switch 80 is shifted in the proper direction. The circuits for the coils of the contactors of all other auxiliaries are completed, however, as in the example now to be described.

A contactor 82a controls the connection of the auxiliary motor 42 driving the master-frequency generator 41, across the buses 35a and 35b. The contactor is operated by a coil 82 controlled by the push button 73 and the relay 78. A relay 83 in the field circuit of the motor 42 and a centrifugal switch 42a responsive to the speed of the motor 42, both of which are normally closed, complete the circuit for the coil 82 after the operation of the relay 78. The energization of the coil 82 actuates the contactor 82a to connect the motor 42 across the buses 35a and 35b.

Figure 10:
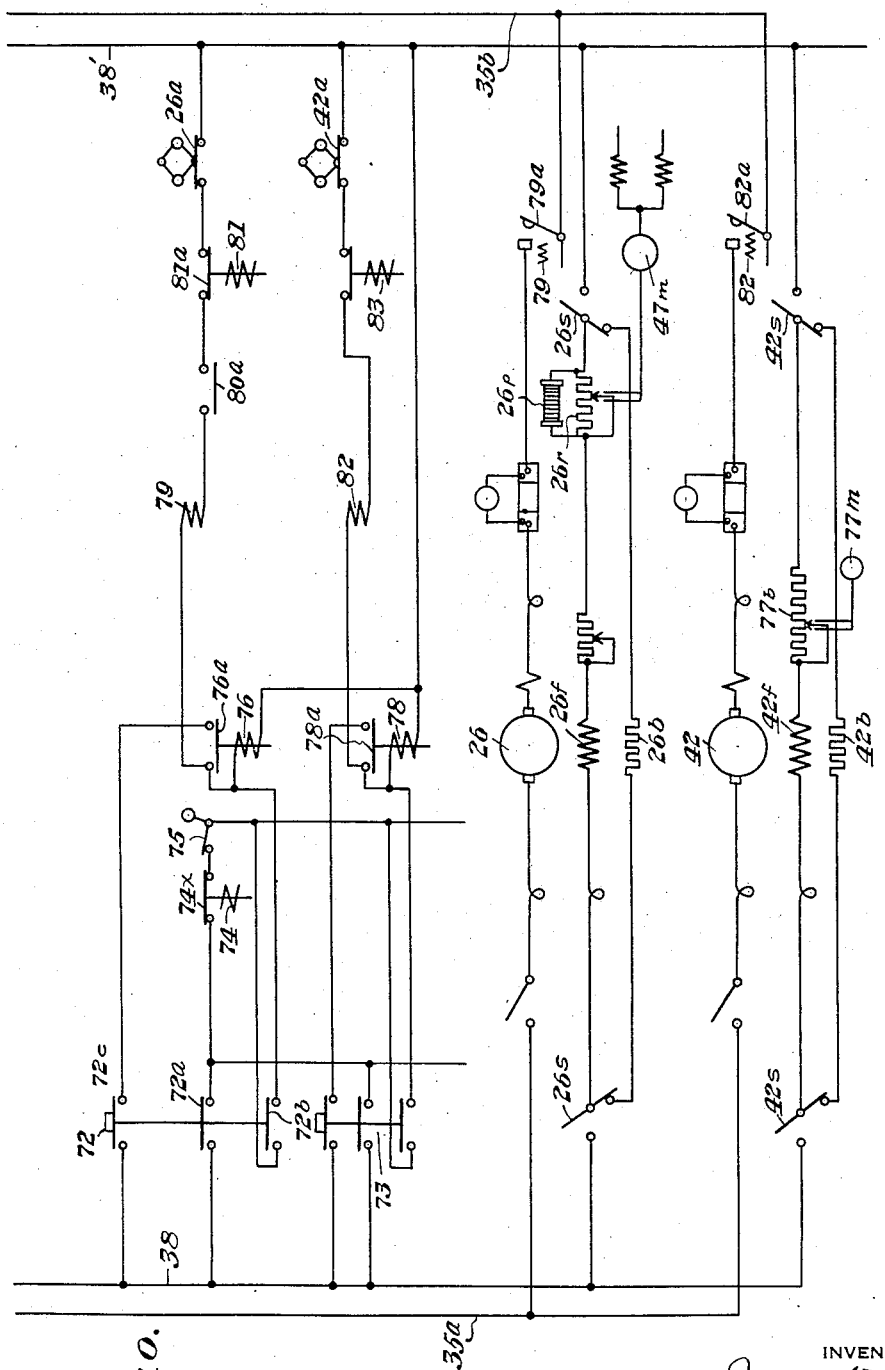

The field windings of all the auxiliary motors are normally connected across the buses 38 and 38'. In Figure 10, for example, the field windings 26f and 42f of the motors 26 and 42 are connected directly to the buses 38, 38' through manual switches 26s and 42s. When the welder is shut down, these switches are opened and their back contacts shunt the field windings through protective resistors 26b and 42b. When all the auxiliary motors except the welding motor 26 are connected across the terminals of the generator 35, it is then only necessary to excite the shunt field winding of the latter to generate voltage to start the auxiliary motors.

The voltage generated by the generator 35 and maintained across the buses 35a and 35b is determined by the degree of excitation of the shunt field winding 35f of the generator. The degree of excitation of the field winding is controlled by two rheostats in series therewith, a rheostat 84 driven by a motor 84m and the rheostat 77a driven by a motor 77m. The function of the rheostat 84 is to insert sufficient resistance in the field circuit to reduce the excitation practically to zero. The function of the rheostat 77a is to vary the voltage actually generated by the generator 35 when the rheostat 84 is in the minimum resistance or shunted position. The rheostat 84 thus serves instead of a switch for deenergizing the shunt field 35f, and is normally maintained in its maximum resistance position by means which will now be described.

*Forward operation of auxiliaries*

A controller 85, adapted to be manually operated, governs forward and reverse movement of a blank through the welder. The controller 85 has fixed fingers a, b, c, d, e, n and r, and movable segments f, g, h, k, m, p, s and t. When the controller is in the off position, in which it is illustrated, a circuit is completed from the bus 38 through finger 85a, segment 85f and finger 85b to the reverse field winding 84r of the motor 84m. If the rheostat 84 is not in its maximum resistance position, the motor will immediately operate to shift it to that position until the limit switch 84L in series with the reverse field winding 84r is opened. I thus insure that there is no excitation of the field 35f and, therefore, no voltage across the auxiliary motor supply buses 35a and 35b, before any of these motors can be connected to the buses.

At the same time, a circuit is completed for the shunt operating coil 86s of a relay 86, the main winding of which is connected in series with the field winding 35f of the generator 35. This circuit includes a limit switch 75z, closed when rheostat 84 is in maximum resistance position, a back contact 87x of a relay 87, the main winding of which is in series with the main winding of the relay 86, and the winding 86s. The relay 87 also has a shunt operating winding 87s. The shunt operating windings 86s and 87s are different from the shunt holding coils of the overload relays previously mentioned in that they are strong enough to operate the relay and hold it in operated position.

A preliminary necessary to the effective operation of the controller 85 in either direction is the closing of a push button switch 88. This completes a circuit from the bus 38 through finger 85a, segment 85f and finger 85b of the controller 85, the push button switch 88, the winding of a relay 89, a back contact 90x of a relay 90 connected in series with the shunt field winding 35f, a back contact 74y of the relay 74 connected across the armature of the generator 35 and a limit switch 75a which, like the limit switch 75, previously described, is closed only when the rheostat 84 is in the maximum resistance position. On the completion of this circuit, the relay 89 closes its contact 89a to energize the operating coil 91 of a circuit breaker 91a which, when closed, connects the generator 35 across the buses 35a and 35b. The circuit through the coil 91 extends also through a back contact 55y of the relay 55 connected in series between the generator 28 and the motor 27, through a plurality of overload relays OL associated with the various auxiliary motors and centrifugal switch 15c responsive to the speed of the welder generator 15. A contact 88x associated with contact 88a (see Fig. 6) opens the circuit to the shunt holding coils of the overload relays to permit their proper resetting in case they have operated in response to abnormal conditions.

As soon as the coil 91 is energized, the circuit breaker 91a closes and operates its auxiliary contacts. A holding circuit for the circuit breaker is completed by one of these auxiliary contacts 91b. The circuit extends from the bus 38 through a front contact 92a of a relay 92 which is normally energized in a manner to be described later, a stop push button 93 having a normally closed contact, the auxiliary 91b which is closed when the circuit breaker 91a closes, a front contact 86a of the relay 86 which is closed by the energization of the coil 86s, as previously described, a front contact 94a of a relay 94 responsive to the voltage of the main power circuit 31, and a holding coil 85r for the controller 85, to the coil 91. The function of the holding coil 85r is to hold the controller 85 in the forward position when it has been manually actuated thereto. If all the relays and protective devices are in proper position, the above described holding circuit for the coil 91 is completed and the breaker 91a remains closed. The generator 35 is now actually connected to its buses 35a and 35b and the various auxiliary motors are connected to the same buses. It remains only to provide suitable excitation for the generator 35 to start up the auxiliary motors. To accomplish this result, it is necessary to shift the controller 85 to the forward position indicated by the dotted line F.

When the controller 85 is moved to the forward position, a circuit is established from the bus 38, through finger 85a, segment 85f, segment 85k and finger 85c, a limit switch 84L, to the forward field winding 84f of the motor 84m and thence to the bus 38'. The motor 84m then operates to shift the rheostat 84 to the minimum resistance position. A similar circuit including segment 85t and finger 85r is also established for a relay 95. This circuit is completed through a limit switch 75x which may be on the same shaft as the switches 75 and 75a but is designed to close its contacts when the rheostat 84 moves away from the maximum resistance position. The relay 95 closes its own locking circuit through its contact 95a and the limit switch 75x.

The movement of the controller 85 also establishes a circuit, as above described for relay 95, for contactor operating coils 96 and 97. The contactor 96 opens a back contact 96x to break a normally closed shunting circuit including a protective resistor connected across the field winding 35f. The contactor 97 closes a contact 97a to connect the circuit of the field winding 35f to the bus 38'. This circuit is now complete except for the operation of the reversing switch 80 which normally occupies a central, open-circuit, position.

A circuit for a coil 80f of the switch 80 is also completed by the movement of the controller. This circuit extends from the bus 38 through finger 85, segment 85f, segment 85m, finger 85d to the coil 80f and thence to the bus 38'. The energization of the coil 80f of the reversing switch 80 causes the latter to close its front contacts 80b and 80c to connect the shunt field 35f across the buses 38 and 38'. The interlock 80a is also closed by the energization of the coil 80f (see Fig. 10) and the coil 79 is thereby energized to close the contactor 79a to connect the motor 26 across the buses 35a and 35b. The other auxiliary motors have already been connected to these buses by the operation of their push buttons similar to that shown at 73. A relay 98 is also energized through a circuit in parallel with that of the coil 80f. The circuit for the coil 98 is completed through the limit switch 75x. The operation of the relay 98 closes its front contact 98a to complete a locking circuit therefor and for the coil 80f through the limit switch 75x.

As the voltage of the generator 35 builds up, the auxiliary motors accelerate simultaneously to the speeds for which they are individually adjusted in a manner to be described later.

The completion of the circuit for the field winding 35f which causes the generator 35 to drive the auxiliary motors, energizes relay windings 86, 87 and 90. The energization of the winding 86 has no effect since its contact 86a was already closed by the energization of the winding 86s. The energization of the winding 87 opens contact 87x and closes contact 87a. The opening of the contact 87x opens the circuit for the coil 86s but the contact 86a does not open since it is held closed by the energization of the coil 86. The closing of the contact 87a completes a locking circuit for the winding 87s which is maintained as long as the controller is in forward position. The energization of the winding 90 opens contact 90x to deenergize relay 89 if it has not already previously been deenergized by the release of the push button 88.

In the normal course of events, a flat plate will be fed to the former and thereby formed into a cylinder. This tubular blank will then be forwarded by feed rolls to the welder, where its edges are seamed by a welding operation, and then passed through sizing and finishing rolls in the known manner. Before describing the cycle of events which takes place upon the advancement of a blank to the welder, however, I wish to point out certain additional operations of the mechanism controlling the operation of the auxiliary motors.

Stopping the auxiliaries

If it is desired to stop the operation of the auxiliary motors without opening the main circuit breaker 91a connecting the generator 35 to its buses, a push button 85s may be operated to shunt the holding coil 85r of the controller 85. The controller is spring biased to its neutral position and upon the deenergization of the holding coil, immediately returns to said position.

If it is desired to open the circuit breaker 91a as well as stop the auxiliary motors, the stop button 93 is actuated to open the circuit for the holding coil 85r and the operating coil 91 in series. The deenergization of the coil 91, of course, will open the circuit breaker 91a. When the controller 85 is restored to neutral or central position, the holding circuit for the coil 87s is broken. The contact 87a opens and contact 87x closes if the contactor 97a is opened. The originally described circuit for the reverse field winding 84r of the motor 84m is completed and the motor operates to shift the rheostat 84 to the maximum resistance position. This deenergizes relays 86, 87 and 90, even if the contactor 97a remains closed.

The relay 95 and the coils 96 and 97 are, however, maintained energized through the contact 95a of the relay 95 the holding circuit of which is completed through limit switch 75x. The relay 98 also maintains its own locking circuit through contact 98a and limit switch 75x and maintains the energization of the coil 80f until the limit switch 75x is opened, indicating that the rheostat 84 is in the maximum resistance position. The relay 98 then opens its contact 98a to deenergize the coil 80f and open the contacts 80a, 80b, and 80c.

When the rheostat 84 is moved to the maximum resistance position, the opening of the limit switch 75x also breaks the locking circuit of the relay 95 and the circuits of coils 96 and 97 maintained thereby. The contact 96x closes to shunt the field winding 35f of the generator 35 and the contactor 97a opens to disconnect the field 35f from the bus 38'. By the operation of the rheostat 84 and the opening of the contact 97a, as before stated, relays 86, 87 and 90 are deenergized. The contact 86a of the relay 86 is thereby opened, as well as the contact 87a of relay 87, while the contact 90x of relay 90 is closed. At the same time, the initial energizing circuit for the coil 96s is restored by the closing of limit switch 75z. The circuit of the field winding 35f is now open at contactor 97 and the insertion of the rheostat 84 further prevents flow of current therethrough. It will thus be apparent that even after the restoration of the controller to the neutral position, the contactor 97a and the contacts 80b and 80c remain closed and the contact 96x remains open until the current through the field circuit has been reduced substantially to zero by operation of the rheostat 84 to maximum resistance position.

If current tends to flow through the generator 35 in the reverse direction, by reason of the momentum of the auxiliary motors and the equipment driven thereby tending to drive the motors as generators, the relay 35z will operate to energize the coil 35h to operate a contactor 35k and shunt the series winding 35s. At the same time, a contactor 35t will be opened by the deenergization of coil 35v. The polarity of the winding 35s', which is thus placed in circuit, is such as to cause the generator 35 to develop a strong, counter electromotive force opposing the voltage generated by the auxiliary motors operating as generators. The flow of excessive currents through the generator 35 is thus prevented. The relay 35z has an armature connected across the shunt 35p in series with the generator 35 and a field winding 35m connected across the control bus.

Reversing the auxiliaries

When it is desired to reverse the auxiliary motors, the controller 85 is moved to the reverse position indicated by the dotted line R. As in the case of the forward movement of the controller, a circuit is established through the forward field winding 84f of the motor 84m. The circuit is from the bus 38 through finger 85a, segment 85f, segment 85g, finger 85c, limit switch 84L to the field winding 84f, and through armature 84m, to the bus 38'. The rheostat 84 is thus operated from its maximum resistance to its minimum resistance position, in which the switch 84L opens the circuit just described to stop the motor. A circuit is similarly completed through segment 85s and finger 85r to energize the winding of relay 95, through the limit switch 75x, which is closed as soon as the rheostat 84 moves away from the maximum resistance position. The relay 95 closes its holding circuit through contact 95a and the coils 96 and 97 are also energized thereby with the result that contact 96x is opened and contact 97a is closed.

Automatic electrode lift

In the reverse position of the controller 85, a circuit extends from the segment 85h through the finger 85e, to an auxiliary contact 37c which is closed when the circuit breaker 37a is closed, through the back contact 14x of a transfer switch 14m, a limit switch 14y, which is closed until the electrode adjusting screws reach their extreme upper limit, the operating coil 99 of a reversing switch 14r, a normally closed back contact 101x, instantaneous overload relays OL' on the various auxiliary motors, and an auxiliary contact 37b which is closed when the contactor 37a is closed, to the bus 38. At the same time, a circuit is completed through controller segment 85p and finger 85n through an auxiliary contact 37d closed when the contactor 37a is closed, and a switch 14z which is normally closed to the operating coil of a relay 100 and thence through the contacts of overload relays OL' and auxiliary contact 37b to the bus 38'.

The operating coil 100 opens a contact 100x which normally shunts the armature of the motor 14 across a dynamic braking resistor. The coil 99 operates the switch 14r to close contacts 99a and 99b to energize the screw motor 14. The motor may be accelerated automatically by known starting systems including starting contactors 14p and 14q. Operation of the motor 14, of course, drives the screws which effect vertical adjustment of the electrode 11. The operation of the motor resulting from the closing of contacts 99a and 99b is such as to raise the electrode out of engagement with the pipe blank. The motor 14 is connected across the mill supply MS through the front contacts 102a and 102b of a spring-closed switch which is normally maintained in the illustrated position by a shunt holding coil 102. In case of failure of the mill supply, the deenergization of the coil 102 permits contacts 102x and 102y to close, connecting the screw motor 14 across the control buses 38, 38'. A series holding coil 102s holds the switch in open position until it is manually re-closed upon restoration of the voltage on the circuit MS. In this way, power is always available for the elevation of the electrode and, in case of the stoppage of the tube blank in the welder, which would result in injury to the electrode, the system is always operative automatically to lift the electrode out of contact with the work. Various means for effecting this operation will be described later. The control circuits for the motor 14 are likewise transferred to the mill supply by the operation of auxiliary contacts of the contactor 37a, on the opening of the latter. A manual switch 37p, closed after the system is started, completes the transfer circuit.

The motor 14 continues to operate until the adjusting screws are raised sufficiently to actuate the switch 14m to open contacts 14x and 14z and close contacts 14a. The opening of contacts 14x breaks the circuit for the coil 99 and the contacts 99a and 99b of switch 14r are thereby opened to stop the motor 14. The opening of contacts 14z deenergizes the coil 100 and permits the contact 100x to re-close, shunting the armature of the motor 14, for dynamic braking.

It is desirable to raise the electrode not only in case of the stoppage of a blank in the welder but also when reversing the auxiliaries and it will be apparent from the foregoing that the raising of the electrode is the first step resulting from a reversing of the controller 85. With the electrode raised out of normal operating position, conditions are proper for a reversal of the auxiliaries.

*Reversal of polarity of generator driving auxiliaries*

The closing of the contacts 14a of the switch 14m extends the circuit previously traced through the auxiliary contact 37c to a coil 80r which is connected directly to the bus 38' which, when energized, is effective to move the reversing switch 80 into such position as to reverse the connection of the field winding 35f of the generator 35 in its circuit between the buses 38, 38' by closing contacts 80d and 80e. The closing of the contacts 14a also energizes a relay 103 through a circuit including the limit switch 75x. This relay closes its contact 103a to complete its own locking circuit and that of the winding 80r. By the operation of the switch 80, contacts 80d and 80e of the switch are closed, and interlock 80a is open, opening the circuit of coil 79 to disconnect the motor 26 from the buses 35a and 35b. The field winding 35f of the generator 35 is thus connected across the buses 38, 38' so as to cause the generator to develop a voltage of reverse polarity which causes the auxiliary motors to reverse. Since the field windings of the auxiliary motors are connected across the buses 38, 38', their polarity will not be changed and the reversal of the voltage across the armatures of the motors will cause them to rotate in the reverse direction.

As the reversed field of the generator 35 builds up, the generator supplies current of correspondingly reversed polarity to the auxiliary motors. In order to maintain the desired operation of the contactors 35k and 35t under the control of the relay 35z, I reverse the connections between the relay and the operating coils 35h and 35v of the contactors by means of a reversing switch 80', the operation of which is co-ordinated electrically or mechanically with that of the reversing switch 80. The relay 35z and the twin series field windings of the generator 35 thus operate in the same manner to protect the generator armature against excessive current, regardless of the reversed polarity of the field winding.

When the contacts 80d and 80e are closed to connect the field winding 35f in circuit, the relays 86, 87 and 90 operate in a manner already described in connection with the actuation of the controller to the forward position.

When it is desired to stop reverse rotation of the auxiliary motors, the controller 85 is restored to its neutral position. The circuit for the reverse field winding 84r of the motor 84m is again completed and the rheostat 84 moves to the maximum resistance position to deenergize the field winding 35f. The limit switch 75x is thereby opened and the locking circuit for the coil 80r and the relays 95 and 103 is opened. The coils 96, 97 being thus deenergized, the contact 96x closes and the contact 97a opens. The deenergization of the coil 80r permits the reversing switch 80 to assume its neutral position opening the contacts 80e and 80d. It is to be noted that no contactors are opened until the generator field current is reduced to zero by rheostat 84, since the relay 103 maintains a holding circuit for the contactor operating coils until limit switch 75x opens.

*Lowering the electrode*

If it is now desired to resume forward operation of the auxiliary motors, the controller may be thrown to the forward position with the results previously described. If it is desired to lower the electrode into blank engaging position, this may be accomplished by operating a push button 104. At its contact 104a, the push button completes a circuit for a coil 105 through a limit switch 14w which is opened only when the electrode adjusting screws have reached their final lower limit, and an interlock 99x which is closed when the coil 99 is deenergized. At its contact 104b, the push button completes a circuit for the coil 100. The coil 105, when energized, causes the reversing switch 14 to close its contacts 105a and 105b to reverse the screw motor 14. As the reverse operation of the screw motor starts, contacts 14a are opened and contacts 14x and 14z are closed. The opening of contacts 14a has no effect since the coil 80r controlled thereby has already been deenergized. The closing of the contacts 14x is likewise without effect, as is the closing of the contacts 14z, since the circuit for the coil 100 is completed through the contact 104b of the push button 104. The push button at 104, obviously, must be held closed throughout the downward operation of the screw motor 14. When is is released, the coils 100 and 105 are deenergized to stop the motor and apply dynamic braking to the armature by the closing of contact 100x. A push button 106 is similarly effective to raise the electrode under manual control by energizing contactor coils 99 and 100.

*Sequence of operations for welding a tube blank*

In this portion of the description, it will be assumed that the preliminary steps already described have been performed, that the welding generator is being driven, and the auxiliary motors are operating at normal speed. If a flat plate is now fed to the former, it will be bent into tubular shape with its edges abutting, to form a tube blank. The details of the former are not shown since they are already well known. The motor 42 is typical of the motors driving the rolls of the former, feed roll stands, planishing rolls, sizing rolls and the like. After the tube blank has been formed, it is preferably fed to feed rolls with its seam in proper position for engagement by the electrode 11.

*Automatic polarity-reversal apparatus*

While the tube is advancing toward the electrode 11, a flag switch 107 completes one of two circuits alternatively to hold the reversing switch 59 in one of its two extreme positions. It will be assumed that the switch 107 is in such position as to complete a circuit for the coil 59L of the switch 59 effective to move the switch to the left.

The construction of the switch 107 is more clearly shown in Figures 14 and 15. The switch comprises a conducting disc 108 having two series of projections 109 extending axially from opposite sides thereof. The projections on each face are spaced peripherally of the disc between the projections on the opposite face. Ratchet teeth 110 are formed on the periphery of the disc 108 for engagement by a detent 111. The disc 108 is embedded in insulation 112 through which the projections 109 extend.

The switch assembly is rotatably mounted on a shaft 113 in electrical contact with the disc 108. A yoke 114 is rotatable on the shaft 113 and provides a mounting for the detent 111. The yoke 114 has insulated contacts 114a and 114b arranged to engage the projections 109 on opposite sides of the disc 108 alternately. The yoke 114 carries a roller 115 adapted to be engaged by an advancing tube blank to shift the yoke clockwise. The disc 108, of course, moves clockwise, as shown in Figure 14, with the yoke because of the engagement of the detent 111 with the ratchet teeth 110. When a blank passes over the roller 115, however, the yoke 114 is reset by a spring without returning the disc 108.

Figure 7:
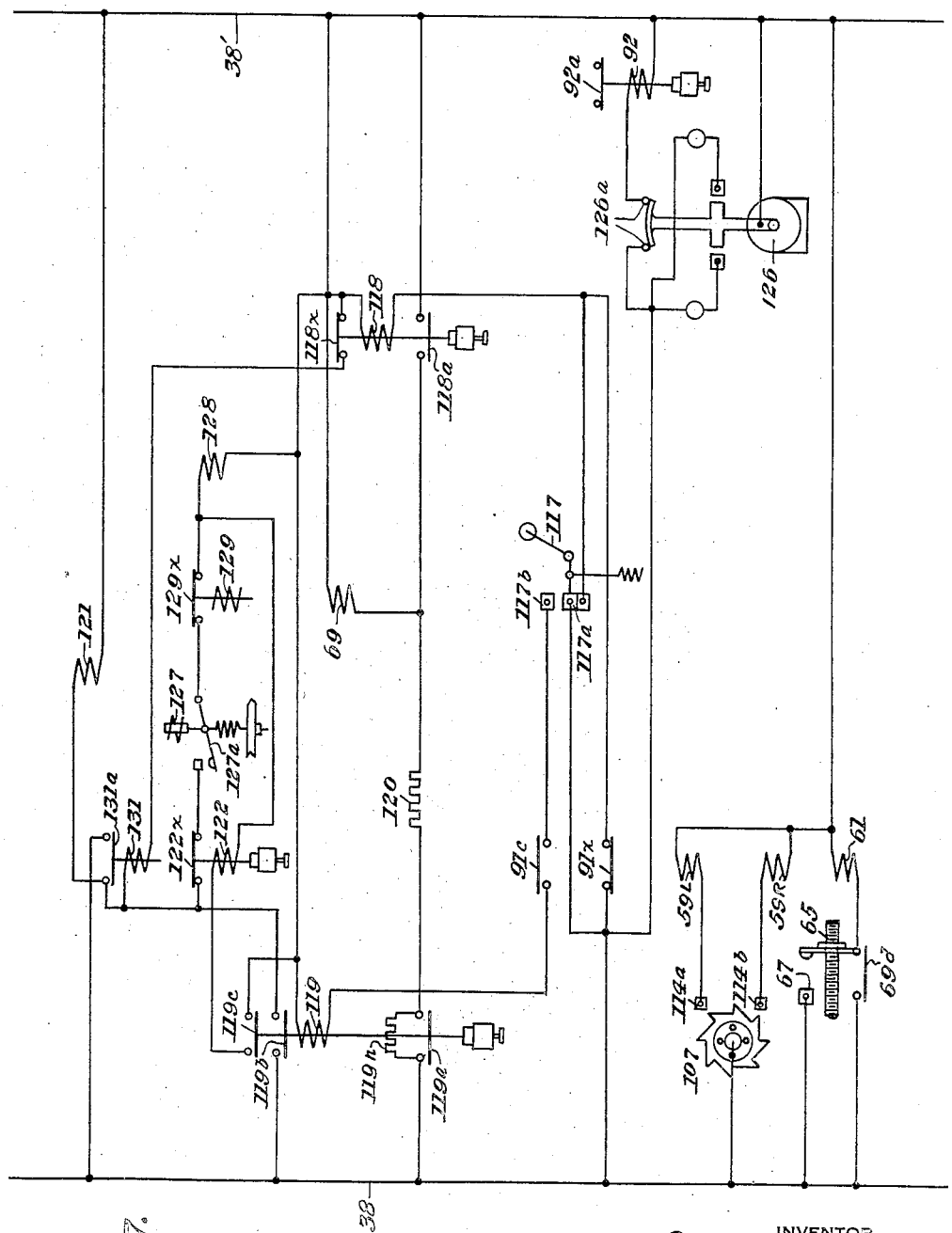
Figure 8:
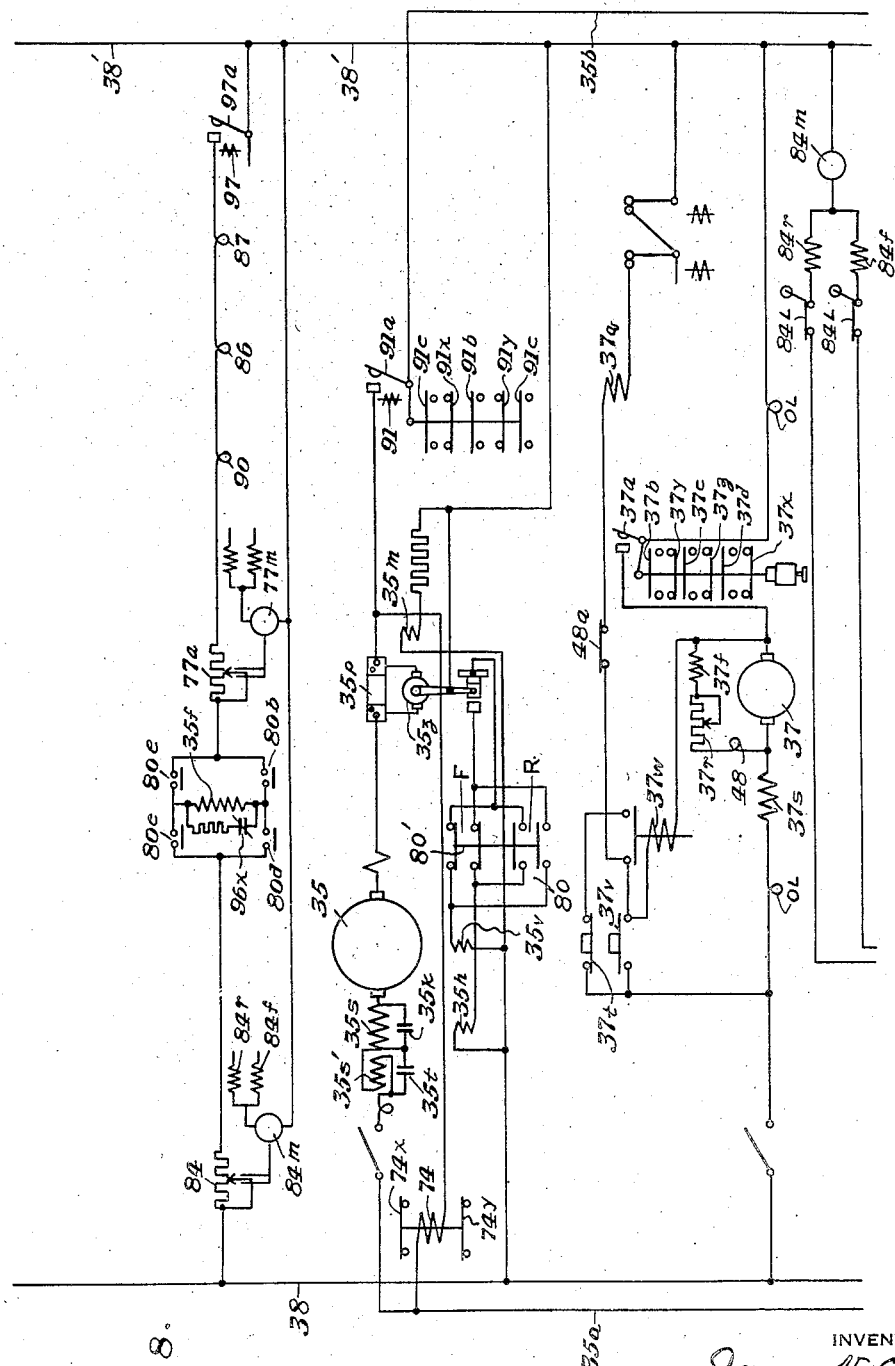

The device is designed and constructed so that the movement imparted to the disc 108 by the engagement of a blank with the roller 115 is sufficient to move the next succeeding projection 109 into position for engagement by one of the contacts 114a, 114b when the yoke is retracted by its spring. By this construction, the switch 107 is effective to close one of two circuits alternately every time a blank traverses the welder. The circuit is also maintained closed during periods between the successive passages of blanks through the welder. Assuming the contact 114a and switch 107 to be closed, a circuit is established (see Figs. 5 and 7) from the upper control bus 38 to the disc 108 of the switch 107 through a slip ring 108a. The circuit then continues through contact 114a and conductor 59k to the winding 59L of the switch 59 and thence returns to the bus 38'.

Initial conditions

It will be apparent that the switch 107 thus determines the position of the switch 59 but the latter may be in either position at any given time dependent only on the position of the contacts of the switch 107. As stated earlier in this description, the operation of the switch 59 connects the field windings 15f of the generator 15 in circuit to receive a limited exciting current of a predetermined polarity.

The motor 42 is now being driven at a predetermined speed, the same as all the other auxiliary motors, and drives the generator 41 to provide a predetermined frequency of alternating current on the master-frequency bus 41a connected thereto. The motor 45 is drawing energy from this bus through a contactor 45a which is normally in closed position. The generator 43 thus supplies alternating current to a differential relay 116, of the same frequency as that supplied directly thereto from the bus 41a. The contacts of the differential relay are therefore in neutral position. The relay is constructed like an induction motor with a wound rotor which moves only when the frequencies of the voltages applied to the rotor and stator differ.

A flag switch 117 adapted to be engaged by the advancing tube blank is normally maintained by a spring in position to close its contacts 117a. This switch completes a circuit from the bus 38 through said contacts and a relay 118 to the bus 38'. The relay 118 thus normally maintains its contact 118a closed. This completes a circuit from the bus 38 through a resistor 119r adapted to be shunted by a contact 119a of a relay 119, a resistor 120, and the contact 118a, to the bus 38'. The contact 118a thus shunts and prevents energization of the operating coil 69 for actuating the contacts 69a, b, c, d, x and y, controlling the connection of the shunt field windings 15f to the battery 58.

First steps in welding sequence—initial excitation of welding generator.

When a tube blank advances toward the electrode 11, it engages the flag switch 117, opens contacts 117a and closes contacts 117b. The relay 118 is thus deenergized. There is a parallel circuit for this relay through an auxiliary contact 91x operated by the circuit breaker 91a, but this auxiliary is open since the circuit breaker is closed. The deenergization of the relay 118 results, after a definite time, in the opening of contact 118a which moves the shunt from around the coil 69. The closing of the contact 117b completes a circuit through an auxiliary contact 91c closed when the circuit breaker 91 closes, the coil of a relay 119 and thence to the bus 38'. The relay 119 is immediately energized and, after a predetermined time, closes its contacts 119a, 119b, and 119c. The closing of the contact 119a shunts the resistor 119r and causes the energization of the coil 69 to operate contacts 69a, c, d, x and y. The contact 119b of the relay 119 completes a circuit through the winding of a relay 121. The energization of the coil 121 closes its contact 121a to shunt the resistor 15r in the circuit of the field windings 15f, which limits the field current while there is no blank in the welder. The contact 119b also completes a circuit including contact 118x for a relay 131 which establishes a parallel circuit for coil 121, through contact 131a.

When the coil 69 is energized as described, it opens contacts 69x and y, and closes contacts 69a, 69c and 69d. The closing of contact 69d, as previously described, effects energization of the operating coil of the switch 61 to cause the contacts 61a and 61b to close and contacts 61w and 61x to open. The field windings 15f are thus connected directly through the contacts 69a and 69c to the circuit extending from the battery 58 through the reversing switch 59. Normal exciting current is thus supplied to the field windings and normal welding voltage is generated. The relays controlling the operation of contactor coil 69 are timed so that normal welding voltage is developed almost immediately upon the engagement of the electrode 11 by the blank.

Figure 3:
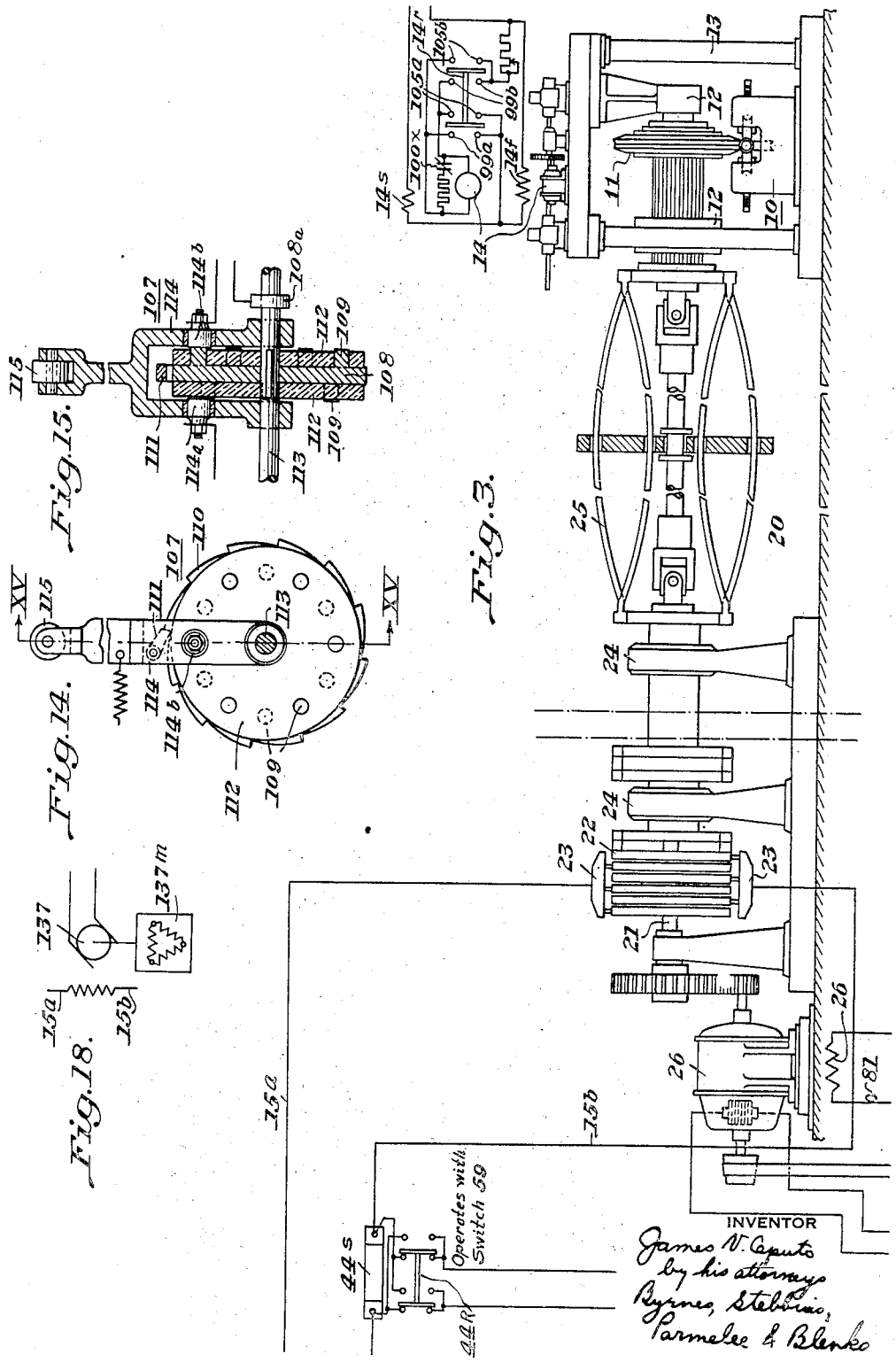
Figure 4:
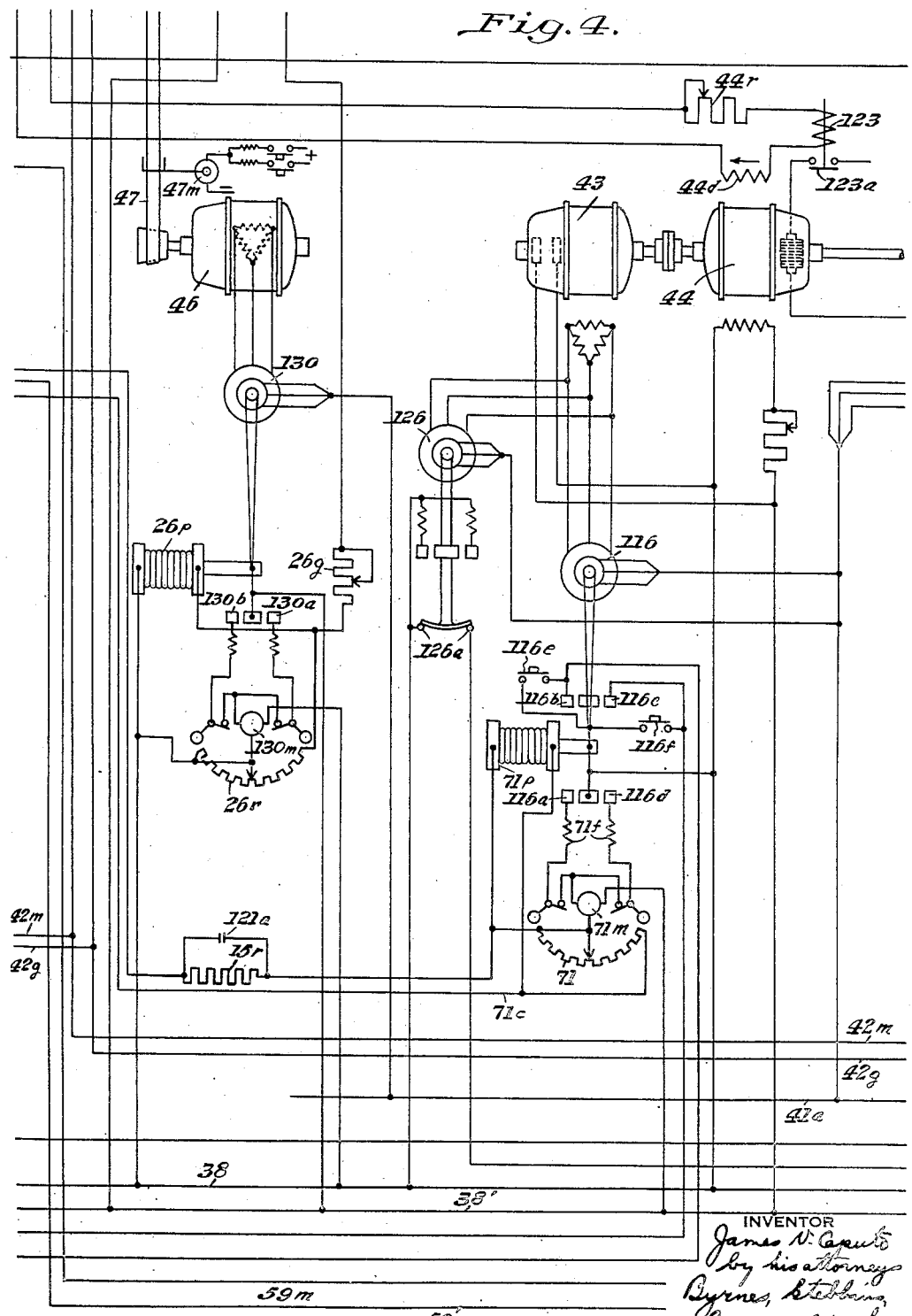
Figure 5:
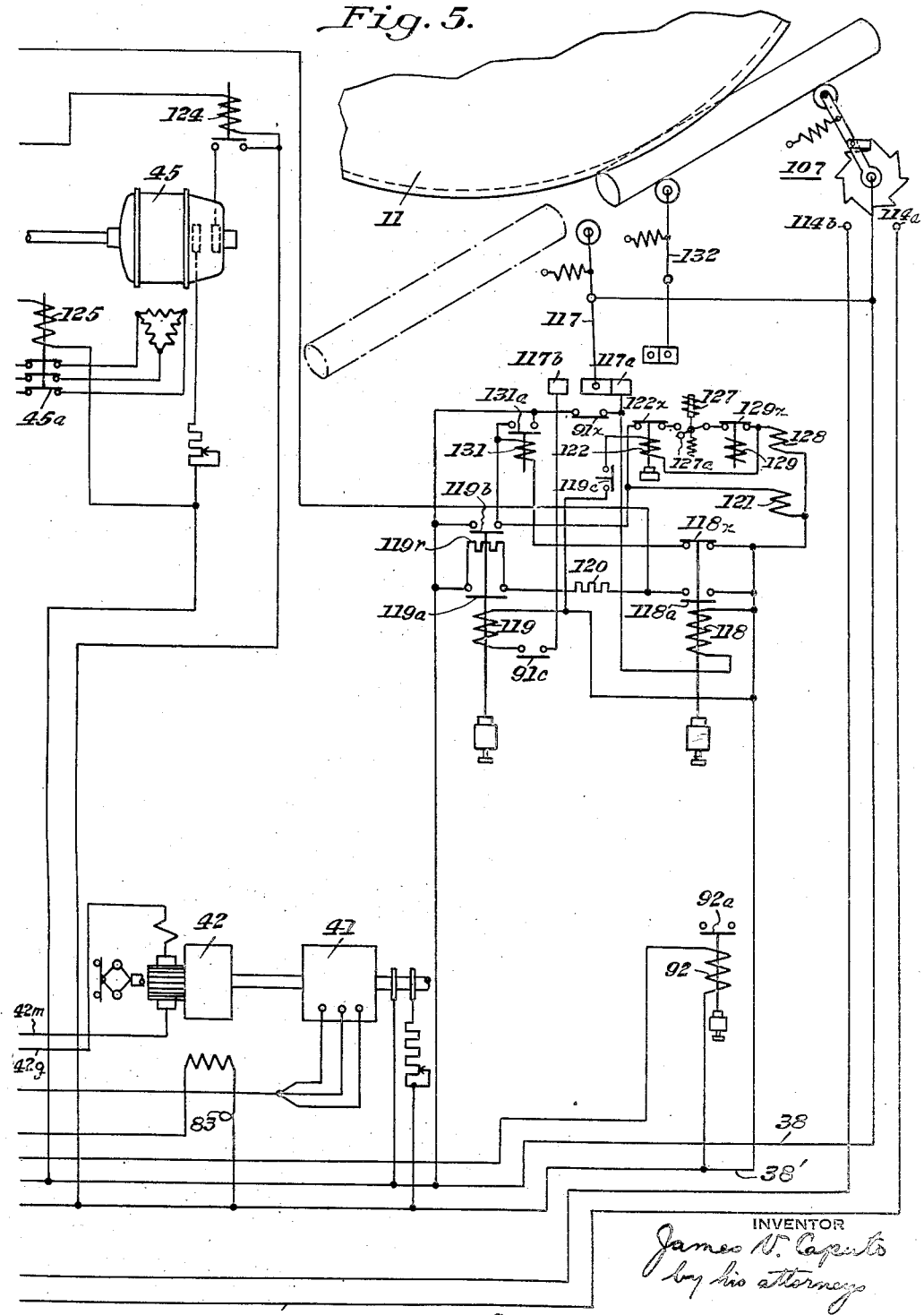

Second step in welding sequence—temporary over-excitation of welding generator As soon as the advancing tube blank engages the electrode, the welding generator supplies current through conductors 15a and 15b to the welding electrode 11 through a shunt 44s to the mechanism shown in Figure 3 for driving the electrode and conducting the welding current thereto.

Welding current immediately starts to flow across the seam in the tube blank. The flow of welding current sets up a voltage across the shunt 44s which operates a relay 123 connected across the shunt in series with a rheostat 44r, and a differential compound winding 44d of the motor 44, through a reversing switch 44r. The operation of the relay 123 closes its contacts 123a to connect the armature of the motor 44 across the buses 38, 38' in series with a relay 124 and a relay 125. The operation of the relay 124 opens the circuit of the field winding of the motor 45. The operation of the relay 125 disconnects the alternating-current winding of the motor 45 from the generator 41.

The generator 43 is now being driven by the motor 44. The speed of the latter increases as the welding current increases and the excitation of the winding 44b likewise increases. As the speed of the motor 44 increases, the frequency developed by the generator 43 increases and, because of the difference in frequencies delivered to the moving and stationary elements of the differential relay 116 and a similar relay 126, the moving elements of these relays shift to operate their contacts. The connections of the series field windings 15s are controlled in exactly the same manner as the connections of the field windings 15f. The flow of welding current through the winding of the series exciter 15x causes the series field windings 15s of the generator 15 to be energized in proportion to the magnitude of the welding current whereby a compounding effect is obtained in the excitation of the welding generator.

The flow of welding current also operates a relay 127. The operation of this relay quickly closes its contacts 127a to complete a circuit for a relay coil 128. The circuit for this coil extends through the contact 119b, contact 122x, the contact 127a, and a back contact 129x of a relay 129 responsive to the voltage across the armature of a series exciter 15x. The energization of the coil 128 closes a contact 128a which shunts the rheostat 71 connected in series with the field windings 15f, and a carbon-pile rheostat 71p in parallel therewith. The rheostat 71 is driven by a motor 71m. With the resistor 15r and rheostats 71 and 71p shunted, the full voltage of the battery 58 is applied to the shunt field windings 15f which are thereby over-excited to build up full excitation in a minimum time interval. The closing of contact 127a completes a circuit for the coil of relay 122 in parallel with that of coil 128. While the welding generator voltage is thus being built up, the time limit of the relay 122 is elapsing and it finally opens its contact 122x so that the coil 128 is deenergized and the contact 128a opened. Winding 122 is likewise deenergized. The shunting of the field rheostats of the generator 15 is thereby terminated either by relay 122, by lapse of time, or by relay 129, by the building up of the voltage across the armature of the exciter 15x. The operation of relay 129 further opens the circuit of relay 122. The exciter 15x is driven by a motor 15m at constant speed and is excited by the current supplied by the welding generator to the electrode 11.

*Automatic control of welding voltage*

While the above described operations are taking place to build up the voltage of the generator 15 initially, the motor 71m is operating under the control of the differential relay 116 to adjust the voltage in the proper direction to the desired value. As long as the welding current is below normal value, the speed of the motor 44 will be such that the generator 43 develops a frequency below that of the master frequency generator 41. The relays 116 and 126, therefore, tend to operate their contacts. The relay 116 first closes a contact 116a to energize one of the two field windings 71f of the motor 71m in series with the motor armature to move the rheostat so as to reduce the resistance thereof. The motor 71 is connected across the bus 38, 38', by operation of the relay 116 to close contacts 116a. The same movement of the relay 116 compresses the carbon-pile rheostat 71p to reduce its resistance. If the welding current is still below normal after these adjustments have been made, the relay 116 closes contact 116b. This completes a circuit for the motor 49m including one of its two field windings so as to operate the rheostat 49. The initial movement of the rheostat decreases the resistance in the circuit of the field of the exciter 39 supplying excitation for the generator 28. This increases the generator voltage and accelerates the motor 27 with the result that the generator 15 develops a higher voltage. If this adjustment is insufficient, continued operation of the motor 49 increases the resistance in series with the field of the exciter 40 supplying excitation to the motor 27. This decreases the motor excitation and further accelerates it. A converse adjustment follows closure of the contacts 116c and 116d. Push buttons 116e and 116f in parallel with contacts 116b and 116c permit manual control of the welding current. They are also useful for setting the speed of the main motor generator to a minimum when the system is shut down. If this precaution is taken, the motor generator set starts at a minimum speed and must be accelerated to normal speed by push button 116c.

As the welding current increases, due to the operations just described, the speed of the motor 44 increases and when the generator 43 is operating in synchronism with the generator 41, the relays 116 and 126 return to neutral position. The movement of the blank through the welder continues, with the result that its edges are welded together by an electric current of the magnitude required for the established speed of travel.

*Automatic control of speed of auxiliaries*

The speed of travel of the blank through the welder is correlated automatically with the magnitude of the welding current. Obviously, a definite current is required to weld a unit length of a seam of given thickness and, the greater the current available, the greater the permissible speed of the blank through the welder.

As already pointed out, the speed of the auxiliaries is determined by the voltage of the generator 35 and the frequency of the master-frequency generator 41. Both these factors may be controlled by operating the rheostat 77. Push buttons 77p permit the rheostat to be shifted in either direction. Clockwise rotation of the rheostat wipers will decrease the resistance in the circuit of the field winding 35f and therefore increase the generator voltage and the speed of the auxiliaries. Further movement will increase the resistance of the field circuit of the motor 42 and thereby increase the frequency of the generator 41.

In addition to the control of the speed of the auxiliaries by varying the voltage of the generator 35 and the speed of the master-frequency generator by the rheostat 77, the speed of each auxiliary motor is further controlled. A typical example of this auxiliary control will be described in connection with the welder motor 26. The field winding 26f of the welder motor 26 is connected across the bus 38, 38' in series with a rheostat 26r, in parallel with which is connected a carbon-pile rheostat 26p. A manual rheostat 26g is also connected in the circuit for preliminary adjustments. As long as the motor 26 operates at the speed set by the master-frequency generator 41, the generator 46, driven by the motor 26, will generate an alternating voltage having the same frequency as that generated by the master-frequency generator 41, and a relay 130 similar to the relay 116, responsive to the frequencies of the generators 41 and 46 respectively, remains in neutral position.

The frequency of the generator 46 may be adjusted to the proper value when the motor 26 is operating at the proper speed, by means of a reversible adjusting motor 41m controlled manually.

If the motor 26 tends to slow down for any reason, however, the relay 130 is immediately operated to increase the resistance in series with the shunt field winding 26f by first releasing the pressure on the carbon-pile rheostat and then by closing contacts 130a to operate a motor 130m to shift the rheostat 26r in the manner already described for the rheostat 71. When the motor 26 is accelerated to the proper speed, the relay 130 returns to neutral position and further adjustment of the rheostat 26r and the carbon-pile 26p ceases. A converse adjustment is made for an excessive speed of the motor 26 by closure of the contacts 130b. It will be apparent, from the foregoing, that I thus provide not only a speed control common to all the auxiliary motors, but also a speed control individual for each motor.

*Third step in welding—terminating welding current*

After the blank has largely passed through the welder and just as the trailing end is about to enter the welding pass, the flag switch 117 is released, its contact 117b opened and contact 117a closed. Relay 119 is thus deenergized and relay 118 is reenergized. Such operation of either of relays 118 or 119 opens the circuit for a relay 131 at 118x or 119b. It will be understood that the relay 119, although deenergized, maintains its contact 119b closed for a definite length of time sufficient for the end of the blank to approach the electrode. Coil 121 is thus deenergized at a time such that the welding current is reduced before the end of the blank passes the electrode, by the re-insertion of resistor 15r in the circuit of the welding generator field.

After a definite time, slightly less than the time required for the trailing end of the tube to engage the electrode, the relay 118 closes its contact 118a to shunt the coil 69. The deenergization of the coil 69 opens contacts 69a, 69c and 69d and closes contacts 69x and 69y. The original circuit of the field windings 15f is thus restored. The resistors 68 and 68a are of such value that the resulting current will be in the direction opposite that of the current flowing during the welding of the blank. This, following the reinsertion of the resistor 15r in the field circuit, insures prompt deenergization of the field winding and rapid termination of the welding current in two steps which occur almost simultaneously. By this sequence of operations, the voltage across the seam in the blank is reduced to zero very promptly just prior to the instant when the trailing end of the blank disengages the electrode.

The opening of the contact 69d which follows deenergization of the coil 69 breaks the circuit for the coil of the switch 61 and the latter thereby opens its contacts 61a and 61b and reconnects the battery 58 to the charging generator 60.

The cessation of the flow of welding current through the shunt 44s deenergizes the relay 123. This relay opens its contact 123a and thus deenergizes the relays 124 and 125 and the motor 44. The motor 45 is thus reconnected to its alternating current and direct-current sources and continues to drive the generator 43 at a speed such as to generate current of the same frequency as that generated by the generator 41. This operation prevents any drop in the speed of the generator 43 from tending to cause the relay 116 to increase the voltage of the generator 15.

*Automatic polarity—reversal operation*

When the tube blank finally leaves the welder, the yoke 114 of the switch 107 is released and contact 114b thereof engages the next projection on the disc 108 to establish a circuit through conductor 59m to operating coil 59R of the switch 59. The switch 59 is thereby operated so that it reverses the connection of the shunt field 15f to the battery 58. This change in connections is made only after the switch 61 has opened to disconnect the battery from the field winding. The series coils 59s of the switch 59 prevent the latter from opening while field current is flowing. The operation of the switch 59 also causes operation of the reversing switch 44R by mechanical or electrical interlocking, so that the effect of the welding current on the motor 44 will be the same regardless of the polarity of the welding current. It will be apparent that the operation of the reversing switch 59 changes the polarity of the electrode 11. This insures that the wear on both halves of the electrode will be uniform since the polarity is reversed for every blank passing through the welder.

*Safety features*

It will be apparent from the description already given that the operation of the system may be stopped instantaneously by opening the circuit for the holding coil 85r and the contactor coil 91. The relay 92 previously mentioned (see Figure 7) is effective when deenergized for a predetermined length of time to open this circuit by dropping its contact 92a. The circuit of the relay 92 is normally maintained closed through the contacts of the differential relay 126.

Upon the occurrence of a difference between the frequency of the master frequency generator 41 and the frequency of the generator 43 for a predetermined length of time, the opening of the contacts 126a of the relay 126 will deenergize the relay 92 and stop the operation of the apparatus. The relay 126, of course, opens its contacts momentarily during the correction of temperature disturbances of the equilibrium of the system, but unless these disturbances are of abnormal character, they will be corrected in a time less than that for which the relay 92 is set. The persistence of abnormal conditions beyond this period indicates that the abnormal condition is beyond the power of the system itself to correct and therefore necessitates a shutdown. This is effected in the manner already described when the contact 92a is opened.

Figure 9:
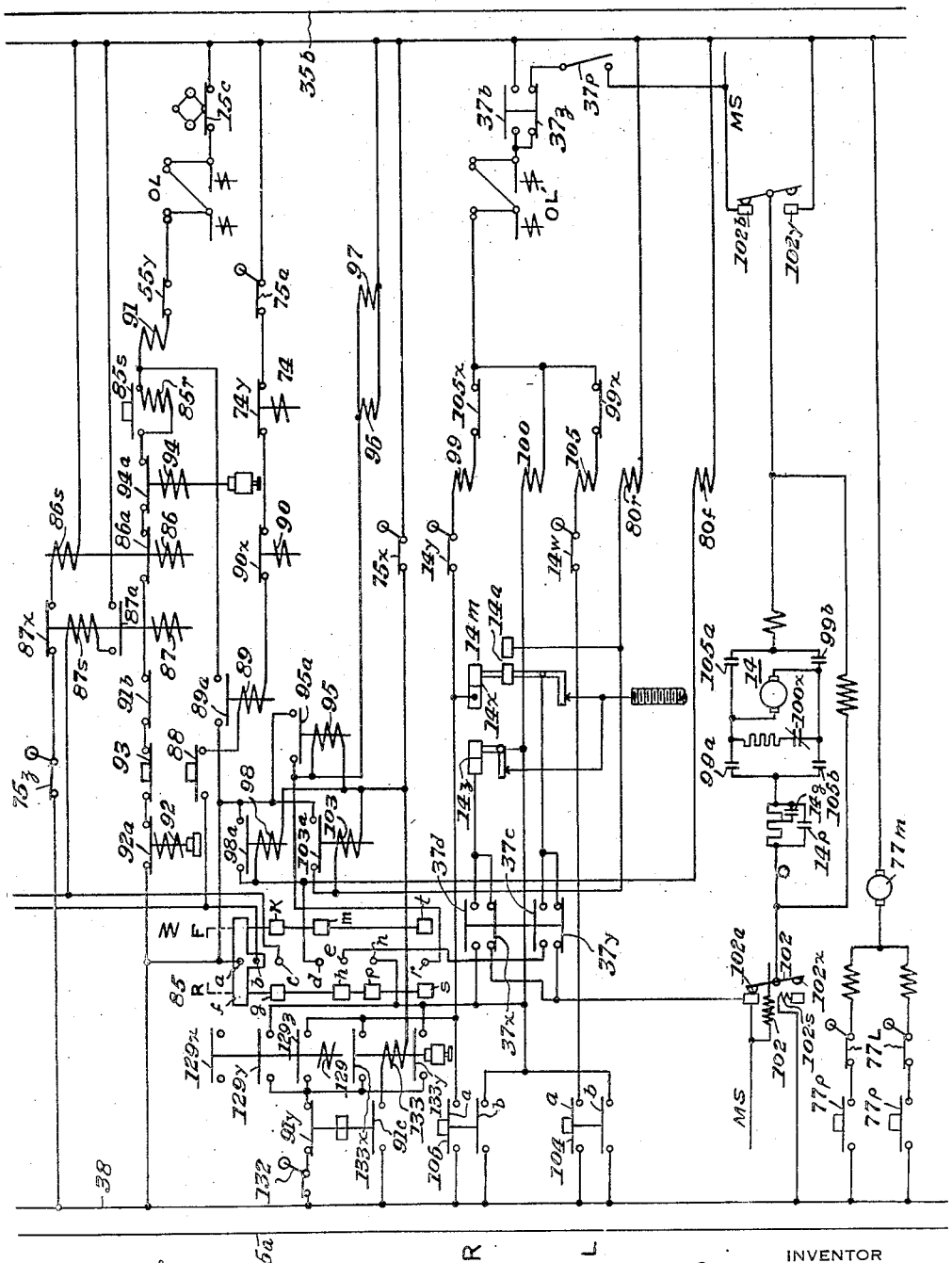

I further provide for automatically lifting the electrode upon the occurrence of an abnormal condition. A circuit for the contactor coil 99, which causes the motor 14 to raise the electrode, is controlled as already described by the push button 106 and the controller 85. A parallel circuit is controlled by contact 129y of the relay 129 (Fig. 9) which is connected across the armature of the series exciter 15s, and the flag switch 132 which is closed as long as a pipe blank is traversing the welder, and an auxiliary contact 91y which is closed when the circuit breaker 91a is open.

This circuit is normally open, since the relay 129 is ordinarily energized as long as a pipe blank is in the welder and the flag switch 132 is open when a blank is not in the welder and, furthermore, the contact 91y is open as long as the circuit breaker 91a is closed. If the welding current should fail, for any reason, while a blank is in the welder, the electrode will automatically be raised if the contactor 91a opens. If this contactor opens, there will be no current available to move the blank through the welder and it is therefore necessary to remove the electrode from contact with the blank. Upon such conditions, the relay 129 completes the circuit through its contact 129y for the contactor coil 100 and through its contact 129z through the contactor coil 99. This automatically raises the electrode, as previously described.

Under normal conditions of operation, a relay 133 is energized through the flag switch 75x and an auxiliary contact 91c closed when the circuit breaker 91a is closed. The contact 133x of the relay 133 is therefore normally open. On tripping of the circuit breaker 91a, however, the contact 91c is opened and the relay 133 deenergized. This completes a circuit through contact 133x for the contactor coil 99 and the motor 14 thereupon operates to raise the electrode. A contact 133y of relay 133 energizes the contactor coil 100.

Figure 13 illustrates a modification of the automatic control of the welding current. A centrifugal device 135, operated in synchronism with the master control frequency generator 41, cooperates with a torque motor 136 responsive to the welding current to control contacts 136a and 136b. These contacts control the coils 136c and 136d of a relay governing the forward and reverse circuits of the motor 71m. A beam 136m, actuated by the motor 136, operates the carbon-pile rheostat 71p. The device shown in Figure 13, therefore, merely replaces the direct current motor 44 and generator 43 for providing a function which can conveniently be compared with the frequency of the master frequency generator. A relay 136e renders the control effective only when welding current is flowing.

A partial modification of the invention is illustrated in Figure 18 in which a series generator 137 similar to that shown at 15x, driven by a motor 137m, is employed to produce a direct current proportional to the welding current, instead of the shunt 44s. It will be understood that the field of the generator 137 is connected in series with the welding circuits 15a and 15b.

It will be apparent from the foregoing description that my invention provides a complete system for the operation and control of a welding apparatus. It will be obvious that a wide variety of safeguards against improper operation have been provided and that the chance for human fallibility to interfere with the correct functioning has been almost entirely eliminated. The actual control mechanism which requires manual operation is of the simplest character and makes it practically impossible for the operator to make a false move. The circuit breaker connecting the generator to the auxiliary motors, for example, will not close until the manual controller is at the off position, the generator field has maximum resistance therein and no current flowing therethrough, and there must likewise be not voltage across the generator itself. Upon power failure, a relay will return the controller to the off position automatically. When the circuit breaker opens due to overload, the maximum resistance is inserted in the circuit of the generator field to limit the excitation and generated voltage. Failure of the generator field current will open the breaker but the field reversing switch will not open as long as current flows in the field winding.

The opening of the circuit breaker connecting the auxiliaries to their generator has the same effect as the departure of a welded tube blank from the welder upon the welding generator. In other words, the generator field is deenergized and the welding current reduced to zero. All the auxiliary motors are simultaneously controlled by the master speed control equipment and are also subject to individual automatic control to correct variations from the proper speed.

The welding current is automatically controlled and is maintained at the same value, when once adjusted, for each successive blank. Any variation in speed immediately causes a corresponding variation in welding current to maintain a predetermined welding current per unit length of seam of a given character. Any sustained departure from normal relations between welding current and speed of auxiliaries will cause the machine to shut down automatically.

It is impossible to connect any of the auxiliary motors to their generator except when there is no voltage on the supply buses. Even if the starting button of the motor is pressed after the generator has built up its voltage, the motor will not be thrown on the line.

All motors and generators are protected against overspeed and overload by relays of known types, only a few examples of which have been illustrated.

When the plant is manually shut down, the welder voltage will be controlled automatically in proper relation to the decreasing speed of the auxiliaries. An auxiliary source of power is provided for the electrode lifting motor so that prompt operation thereof is assured at all times. If the normal source of control current flows, the control for the screw motor is transferred to an auxiliary supply. All motors are provided with dynamic braking.

The welding generator is of the homopolar type and will obtain stable operation over a wide range of voltages, the field is varied only slightly and the remainder of the desired voltage range is provided by varying the speed at which the generator is driven.

If the normal supply of energy for the welder fails, the welder generator and the auxiliary generator are driven by their flywheels for a period sufficient to finish a tube blank if there should be one in process of traversing the welder when the power failure occurs.

While I have illustrated and described herein but one preferred embodiment of the invention with a few partial modifications, it will be obvious that many changes may be made in the present disclosure without departing from the spirit of the invention or the scope of the appended claims.

I claim:

1. In a welder, the combination with a homopolar generator, of a direct current driving motor coupled to the generator, and a variable voltage generator connected to the motor, each of said generators and motor having excitation varying means whereby to vary the voltage of said homopolar generator.

2. In a welder, a generator, a motor for driving the generator, and a generator for driving the motor, and common means for controlling the excitation of said last-mentioned generator and the motor sequentially to effect a variation in the speed of said first-mentioned generator.

3. In an electric welder, the combination with a work-engaging electrode, of a homopolar generator for supplying current thereto, means for controlling the voltage generated by said generator, a storage battery for exciting said generator, means for charging said battery, and means actuated by movement of the work relative to the electrode, for connecting the battery to the charging means when the generator is idle.

4. In an electric welder, the combination with a work-engaging electrode, of a homopolar generator for supplying current thereto, means for controlling the voltage generated by said generator, a storage battery for exciting said generator, means for charging said battery, means actuated by movement of the work relative to the electrode for connecting the battery to the charging means when the generator is idle, and an ampere hour meter for disconnecting the battery from said charging means.

5. In a welder, a work-engaging electrode, means for supplying current thereto, means for moving work past the electrode, and means actuated by such movement of the work for reversing the polarity of said current supply means between successive welding operations.

6. In an apparatus for welding seams in successive lengths of metal, means for supplying current to said seams, means for reversing the polarity of said current, and means operated by movement of successive lengths through the apparatus for actuating said polarity-reversing means between successive welding operations.

7. In an apparatus for welding seams in successive lengths of metal, means for supplying current to said seams, means for reversing the polarity of said current, means operated by successive lengths for actuating said polarity-reversing means, and means for preventing reversal of the polarity of said current supply means while the latter is supplying current.

8. In a welder, a work-engaging electrode, a generator for supplying current to the electrode, and means actuated by movement of the work toward the electrode to overexcite the generator temporarily to establish welding current.

9. In a welder, a work-engaging electrode, a generator for supplying current to the welder, and means actuated by movement of the work past the electrode to apply reversed excitation to the generator substantially at the completion of a welding operation.

10. In a welder, a work-engaging electrode, work-feeding means, a plurality of auxiliary motors driving said means, a motor for driving said electrode, common means for controlling said auxiliary and electrode motors, means for reversing the auxiliary motors, and means for preventing the reversal of said electrode drive motor on reversal of said auxiliary motors.

11. In a welder, a work-engaging electrode, means for adjusting the electrode to and from the work, auxiliary motors for forwarding work through the welder, means for reversing the auxiliary motors, and means actuated by the reversing means for moving the electrode away from the work.

12. In a welder, a work-engaging electrode, means for adjusting the electrode to and from the work, a relay responsive to abnormal conditions in the welder, and means operated by said relay for moving the electrode away from the work.

13. In a welder, a work-engaging electrode, means for adjusting the electrode to and from the work, a main source of energy for said adjusting means, an auxiliary source of energy therefor, and means responsive to failure of one source for automatically transferring the adjusting means from one source to the other.

14. In a welder, a plurality of auxiliary motors, a generator for supplying energy to said motors, means for reversing the excitation of said generator, means for controlling the operation of said excitation-reversing means, and means for preventing successive operation of said excitation-reversing means while current traverses the generator field winding.

15. In a welder, an electrode, current supply means therefor, means for terminating the flow of current from said means to said electrode, and a relay responsive to abnormal conditions in said welder for actuating said second-mentioned means after a predetermined time.

16. In a welder, a work-engaging electrode, a generator for supplying current to the welder, means operated by movement of the work toward the electrode in advance of its actual engagement therewith, and means controlled by said first-mentioned means effective to apply overexcitation to said generator temporarily to initiate the flow of welding current.

17. In a welder, a work-engaging electrode, a generator for supplying current to the welder, means released by movement of the work past the electrode in advance of its actual separation therefrom, and means controlled by said first-mentioned means effective to apply reversed excitation to the generator to terminate the flow of welding current at least by the time the work actually leaves the electrode.

18. In a welder, an electrode, a generator supplying current to the electrode, means effective to control the generator excitation only on passage of the work past the electrode to terminate the welding current, a motor for driving the generator, a supply source for the motor, and a flywheel connected to the motor whereby on failure of the supply source for the generator driving motor the generator is driven by the flywheel.

19. The combination with an electric welder, a source of current supply for said welder, means for feeding work to the welder and auxiliary motors for driving said feeding means, of a control system for said motors including a variable voltage generator for supplying current thereto, means for generating a master frequency proportional to the speed of movement of the work and the magnitude of the current supplied to the welder, and means for controlling said current and the voltage of said generator to vary the speed of said motors in accordance with said master frequency, to maintain constant the character of the weld.

20. In a welder, the combination with a generator, of an adjustable speed driving motor coupled to the generator, and a variable voltage generator connected to the motor, means for varying the voltage of said last mentioned generator and the excitation of said driving motor, and additional means for further varying the voltage of the first mentioned generator, said last mentioned means including means for varying the field excitation of the generator.

21. In a welder, a generator for supplying current to said welder, an adjustable speed motor for driving the generator, means for varying the voltage of said generator comprising means actuated by the passage of work through the welder to vary the speed of the driving motor.

22. In an electric welder, the combination with a work-engaging electrode, of a generator for supplying current thereto, a variable speed driving means coupled to the generator, means for varying the voltage of said generator by varying the speed of the driving means, and means actuated by the work going through the welder for operating said voltage varying means.

23. In an electric welding system, the method of initiating the flow of current from a welding generator which includes the step of varying the speed of the generator.

24. In an electric welding system, the method of terminating the flow of current from a generator which includes the step of varying the speed of the generator.

25. In an electric welding system, the method of controlling the voltage of a welding generator which includes the steps of varying the speed of the generator to vary the welding voltage slightly during the welding operation, and effecting a greater change in the speed of said generator just before the work leaves the welder.

26. In a welder, the combination with a welding generator, of an adjustable-speed driving motor coupled to the generator, an electrode connected to said generator, a second generator supplying current to the adjustable-speed driving motor, a second motor coupled to said second generator, a current supply means for said second motor, and means providing a flywheel effect for said second motor for limiting variations in the current drawn by said second motor when the current delivered by the welding generator to the electrodes varies between zero and full value as successive lengths of material to be welded engage said electrode.

JAMES V. CAPUTO.